(12) United States Patent
Hwang

(10) Patent No.: US 10,945,445 B2
(45) Date of Patent: Mar. 16, 2021

(54) YOGURT FERMENTER AND AUTOMATIC TEMPERATURE CONTROL METHOD THEREFOR

(71) Applicant: EASY YOGURT CO., LTD, Seoul (KR)

(72) Inventor: Yoon Taek Hwang, Seoul (KR)

(73) Assignee: EASY YOGURT CO., LTD, Seoul (KR)

( * ) Notice: Subject to any disclaimer, the term of this patent is extended or adjusted under 35 U.S.C. 154(b) by 22 days.

(21) Appl. No.: 16/609,460

(22) PCT Filed: Nov. 29, 2018

(86) PCT No.: PCT/KR2018/014996
§ 371 (c)(1),
(2) Date: Oct. 30, 2019

(87) PCT Pub. No.: WO2019/212114
PCT Pub. Date: Nov. 7, 2019

(65) Prior Publication Data
US 2021/0045396 A1    Feb. 18, 2021

(30) Foreign Application Priority Data

Apr. 30, 2018    (KR) .......................... 10-2018-0049987

(51) Int. Cl.
*A23C 9/12*    (2006.01)
*G05D 23/19*    (2006.01)
*G01K 13/02*    (2021.01)

(52) U.S. Cl.
CPC ............ *A23C 9/1226* (2013.01); *G01K 13/02* (2013.01); *G05D 23/1917* (2013.01)

(58) Field of Classification Search
CPC ... A23C 9/1226; G01K 13/02; G05D 23/1917
See application file for complete search history.

(56) References Cited

U.S. PATENT DOCUMENTS

2015/0189894 A1\* 7/2015 Hwang ................ A23C 9/1226
99/453

FOREIGN PATENT DOCUMENTS

| JP | 2005065673 | A |   | 3/2005 |
| JP | 2005065673 | A | \* | 5/2005 |

(Continued)

OTHER PUBLICATIONS

JP-2005065673-A Translation (Year: 2005).\*

*Primary Examiner* — Marc E Norman
*Assistant Examiner* — Schyler S Sanks
(74) *Attorney, Agent, or Firm* — STIP Law Group, LLC

(57) ABSTRACT

Disclosed are a yogurt fermenter and a method for automatically controlling the temperature of the yogurt fermenter. The yogurt fermenter and the method for automatically controlling the temperature of the yogurt fermenter, according to the present invention, can optimally ferment a fermentation material contained in a fermentation container by appropriately controlling a heating value of a heating element by a controller depending on a fermentation step of the fermentation material. In particular, considering the characteristics of the fermentation material which gradually decrease in fluidity as the fermentation progresses, the amount of heat generated by the heating element is controlled, and the fermentation material does not stick to a heating part, so that a user can easily clean the heating rod after the fermentation is completed.

12 Claims, 11 Drawing Sheets

(56) References Cited

FOREIGN PATENT DOCUMENTS

| KR | 1020070102187 A | 10/2007 |
| KR | 2020110007621 U | 8/2011 |
| KR | 1020130143501 A | 12/2013 |
| KR | 101521699 B1 | 5/2015 |
| KR | 1020160056011 A | 5/2016 |

* cited by examiner

YOGURT FERMENTER AND AUTOMATIC TEMPERATURE CONTROL METHOD THEREFOR

CROSS-REFERENCE TO RELATED APPLICATIONS

This application is the U.S. National Phase under 35 U.S.C. § 371 of International Application No. PCT/KR2018/014996 filed on Nov. 29, 2018, which in turn claims the benefit of Korean Application No. 10-2018-0049987, filed on Apr. 30, 2018, the disclosures of which are incorporated by reference into the present application.

TECHNICAL FIELD

The present invention relates to a yogurt fermenter that is directly coupled to a milk container to turn milk into yogurt and an automatic temperature control method for the yogurt fermenter that is capable of performing optimal yogurt fermentation.

BACKGROUND ART

If it is desired to make yogurt by fermenting milk, a yogurt starter is mixed with the milk to make a milk mixture, and then, the milk mixture has to be maintained to an appropriate fermentation temperature. In detail, milk drawn from a refrigerator is heated to the appropriate fermentation temperature and is then maintained at the appropriate fermentation temperature, so that normally 8 hours are elapsed to make low fluidity to non fluidity yogurt. In case of a conventional yogurt fermenter, a yogurt starter is mixed with milk, and the milk mixture is poured dividedly into about 10 fermentation cups. Next, the fermentation cups are seated on a heating housing. However, the heating housing of the conventional yogurt fermenter is bulky to need a large area in keeping and using the yogurt fermenter. Besides, the milk mixture has to be put dividedly in the 10 fermentation cups, and the 10 fermentation cups in which the yogurt is stored should be kept at the refrigerator, thereby causing many inconveniences in using the yogurt fermenter. Whenever the yogurt is eaten, of course, the fermentation cups have to be washed, thereby also causing many inconveniences after the use.

So as to solve the above-mentioned problems, accordingly, a yogurt fermenter, which is detachably coupled to a general milk container, is issued to the same applicant as the invention (which is disclosed in Korean Patent No. 10-1521699). Also, a study on an automatic temperature control method for the yogurt fermenter is made by the same applicant as the invention.

FIG. 1 is a graph showing a temperature control method for a conventional yogurt fermenter. Referring to FIG. 1, the temperature control method for the conventional yogurt fermenter is a stepwise temperature control method wherein temperatures of a milk mixture measured by a temperature sensor are divided into several steps and as the temperature of the milk mixture is raised, heating values are decreased step by step. For example, as shown in FIG. 1, if the temperature of the milk mixture is lower than 35° C., a heating value is 40 W (Watt), if it is between 35 and 40° C., a heating value is 30 W, if it is between 40 and 42° C., a heating value is 15 W, if it is higher than 42° C., a heating value is 5 W, and if it is higher than 45° C., heating is cut off. If fermentation time is set by a control panel disposed on the yogurt fermenter, a heating element is operated in the above-mentioned method during the set fermentation time, and if the set fermentation time is elapsed, heating of the heating element is stopped.

In case where such temperature control method is applied, however, the milk mixture may be burned or protein may become hard, so that it is checked that the milk mixture or protein may be stuck to the heating part. A height of the milk container is greater than a width thereof, and a heating part of the conventional yogurt fermenter is located at the lower portion of the milk container, so that as fermentation is developed, fluidity of the milk mixture becomes gradually low, and thus, a temperature deviation becomes high between upper and lower portions of the fermentation container in which the milk mixture is contained to cause a surface temperature of a heating part of the yogurt fermenter to be increased above a denaturation temperature of the milk mixture. The lower an outside air temperature of the milk container is, especially, the higher a heating value becomes, so that the surface temperature of the heating part becomes more seriously increased. Therefore, there is a need for an automatic temperature control method which is capable of preventing the milk mixture from being burned and stuck to the heating part, while a sufficient heating value is being supplied to ensure good fermentation.

DISCLOSURE

Technical Problem

Accordingly, the present invention has been made in view of the above-mentioned problems occurring in the prior art, and it is an object of the present invention to provide a yogurt fermenter and an automatic temperature control method therefor that are capable of performing optimal yogurt fermentation and preventing a milk mixture or protein from being burned and stuck to a heating part, irrespective of changes in an outside air temperature.

Technical Solution

To accomplish the above-mentioned object, according to a first aspect of the present invention, there is provided a yogurt fermenter including: a head part; a coupling part coupled to a lower periphery of the head part in such a manner as to be coupled to an inlet portion of a fermentation container; a heating rod coupled to an underside of the head part in such a manner as to be extended downward and thus located inside the fermentation container and having a heating element built in a lower portion thereof in such a manner as to be located at a lower portion of the fermentation container and a temperature sensor built in an upper portion thereof in such a manner as to be located at an upper portion of the fermentation container; and a controller for controlling a heating value of the heating element according to a predetermined control logic on the basis of a temperature measured by the temperature sensor, wherein i) if the temperature measured by the temperature sensor is lower than a first fermentation reference temperature, the controller allows the heating element to supply a first heating value, ii) from a time point where the temperature measured by the temperature sensor reaches the first fermentation reference temperature, the controller controls the heating value of the heating element to allow a temperature of a fermentation material to be convergedly maintained to a second fermentation reference temperature as a target value on the basis of the temperature measured by the temperature sensor, and iii) the controller allows the heating element to supply a second heating value having a size less than half of the first heating value from a time point coming earlier by predetermined spare time than a time point where temperatures at the upper and lower portions of the fermentation material are reversed to cause the temperature at the upper portion of the fermentation material to be lower than the temperature at the lower portion of the fermentation material, the first fermentation reference temperature being lower than the second fermentation reference temperature, and the spare time being less than time elapsed from the time point where the temperature measured by the temperature sensor reaches the first fermentation reference temperature up to the time point where the temperature at the upper portion of the fermentation material gets lower than the temperature at the lower portion of the fermentation material.

To accomplish the above-mentioned object, according to a second aspect of the present invention, there is provided a yogurt fermenter including: a body for storing a fermentation material and having a heating element disposed at a lower portion thereof and a temperature sensor built on an upper portion of a side thereof; and a controller for controlling a heating value of the heating element according to a predetermined control logic on the basis of a temperature measured by the temperature sensor, wherein i) if the temperature measured by the temperature sensor is lower than a first fermentation reference temperature, the controller allows the heating element to supply a first heating value, ii) from a time point where the temperature measured by the temperature sensor reaches the first fermentation reference temperature, the controller controls the heating value of the heating element to allow a temperature of a fermentation material to be convergedly maintained to a second fermentation reference temperature as a target value on the basis of the temperature measured by the temperature sensor, and iii) the controller allows the heating element to supply a second heating value having a size less than half of the first heating value from a time point coming earlier by predetermined spare time than a time point where temperatures at the upper and lower portions of the fermentation material are reversed to cause the temperature at the upper portion of the fermentation material to be lower than the temperature at the lower portion of the fermentation material, the first fermentation reference temperature being lower than the second fermentation reference temperature, and the spare time being less than time elapsed from the time point where the temperature measured by the temperature sensor reaches the first fermentation reference temperature up to the time point where the temperature at the upper portion of the fermentation material gets lower than the temperature at the lower portion of the fermentation material.

To accomplish the above-mentioned object, according to a third aspect of the present invention, there is provided an automatic temperature control method for a yogurt fermenter having a heating element adapted to supply heat to a lower portion of a fermentation container and a temperature sensor adapted to measure a temperature at an upper portion of the fermentation container in real time, the method including the steps of: a) if a temperature measured by the temperature sensor is lower than a first fermentation reference temperature, controlling the heating element so that a first heating value is supplied from the heating element; b) from a time point where the temperature measured by the temperature sensor reaches the first fermentation reference temperature, controlling the heating value of the heating element to allow a temperature of a fermentation material to be higher than the first fermentation reference temperature and convergedly maintained to a second fermentation reference temperature as a target value on the basis of the temperature measured by the temperature sensor; and c) controlling the heating element so that a second heating value having a size less than half of the first heating value is supplied from a time point coming earlier by predetermined spare time than a time point where temperatures at the upper and lower portions of the fermentation material are reversed to cause the temperature at the upper portion of the fermentation material to be lower than the temperature at the lower portion of the fermentation material, the spare time being less than time elapsed from the time point where the temperature measured by the temperature sensor reaches the first fermentation reference temperature up to the time point where the temperature at the upper portion of the fermentation material gets lower than the temperature at the lower portion of the fermentation material.

Advantageous Effects

According to the present invention, the yogurt fermenter and the automatic temperature control method therefor can estimate the upper and lower temperature reversing time point at which the temperatures at the upper and lower portions of the fermentation material stored in the fermentation container are reversed from the information stored in the controller, thereby lowering the heating value of the heating element to allow the fermentation material to be stably fermented, without any burning. Furthermore, the yogurt fermenter and the automatic temperature control method therefor can measure the time at which the temperature of the fermentation material is increased to a given range and thus estimate the outside air temperature on the basis of the estimated time, thereby determining a level at which the heating value is lowered. Even if the outside air temperature is varied according to seasons or regions, accordingly, a uniform fermentation result is obtained, and also, the heating part is simply washed by means of a general scrubber, thereby giving many conveniences to a user.

MODE FOR INVENTION

Figure 1:
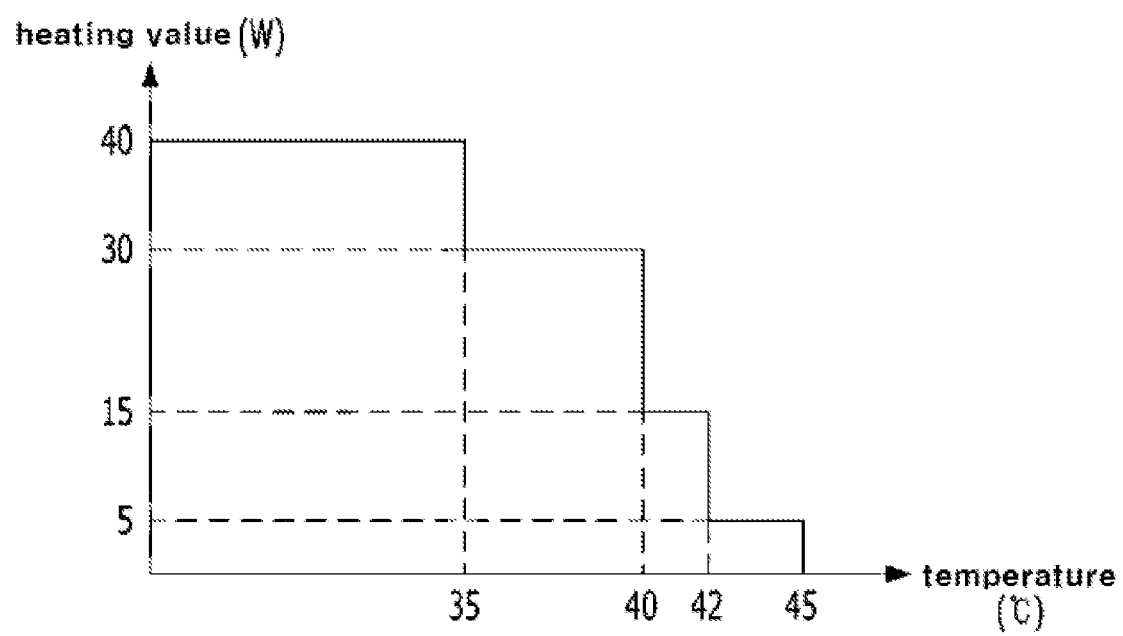
FIG. 1 is a graph showing a temperature control method for a conventional yogurt fermenter.

Hereinafter, the present invention will be in detail given with reference to the attached drawing. The present invention may be modified in various ways and may have several exemplary embodiments. However, this does not limit the invention within specific embodiments. In the description, the thicknesses of the lines or the sizes of the components shown in the drawing may be magnified for the clarity and convenience of the description.

In the description, position relations or directions in the structure of the present invention may be suggested with respect to the attached drawing unless a specific explanation is given. In the description, explanations on space or position relations in the structure of the present invention are given to relative positions of components of the present invention. Also, another component may exist in the space between two components unless no specific description is suggested. For example, when it is said that one member is located "above" or "under" another member, it means that one member may come into contact with another member as well as yet another member may exist between the two members.

Figure 2:
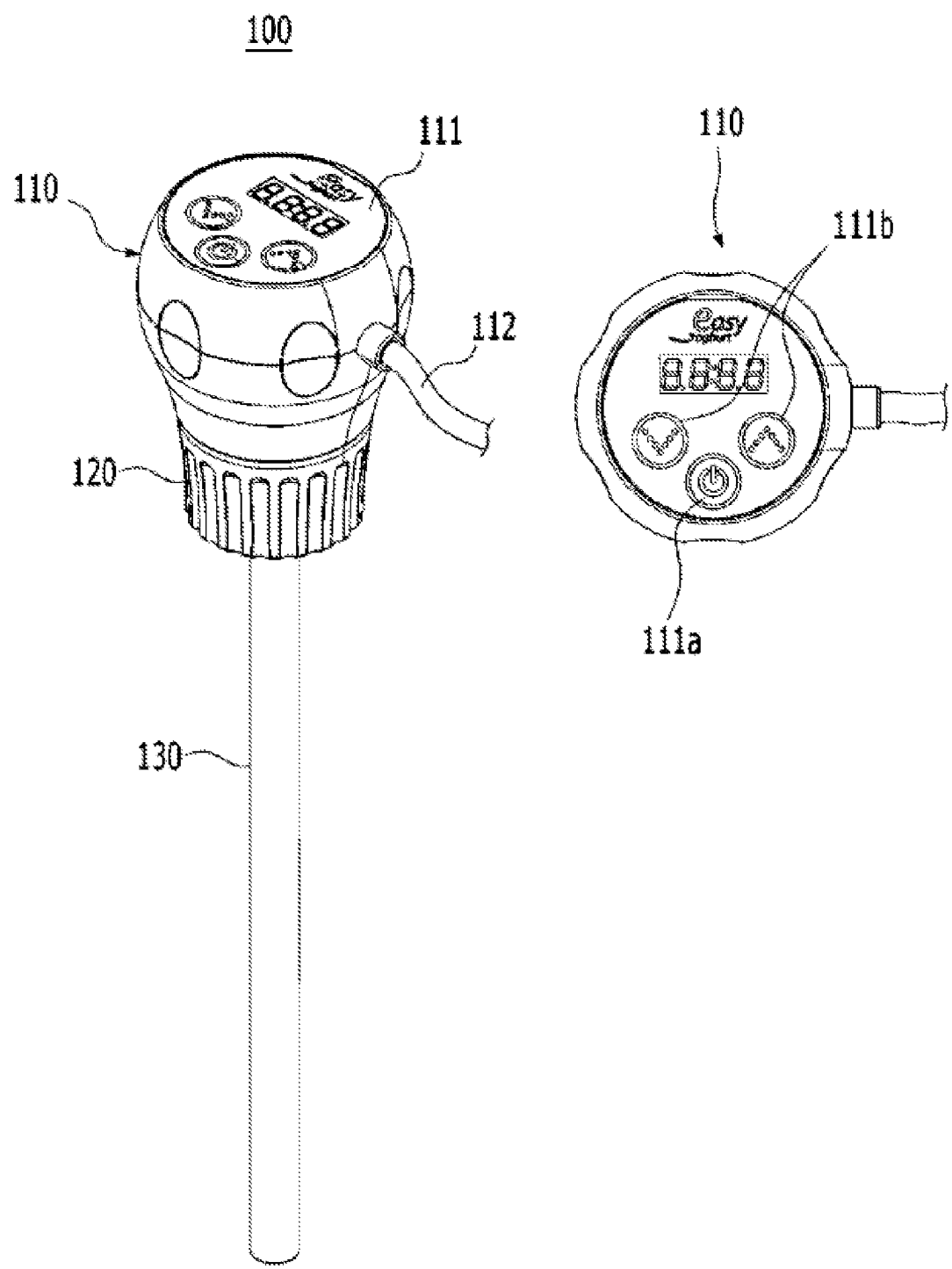
FIG. 2 is a perspective view showing a yogurt fermenter according to a first embodiment of the present invention.
Figure 3:
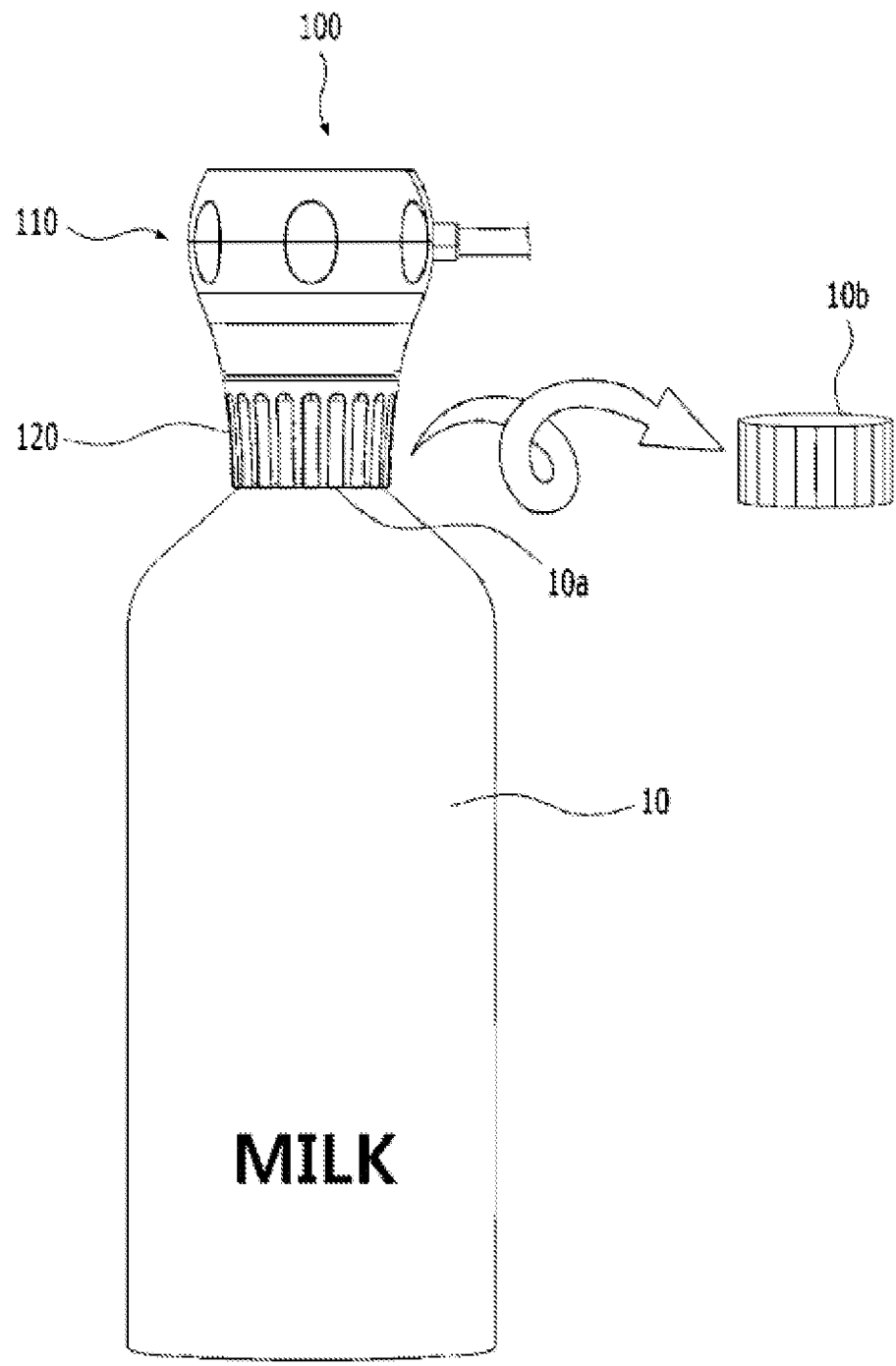
FIG. 3 is a schematic front view showing the yogurt fermenter of FIG. 2, which is coupled to a milk container.
Figure 4:
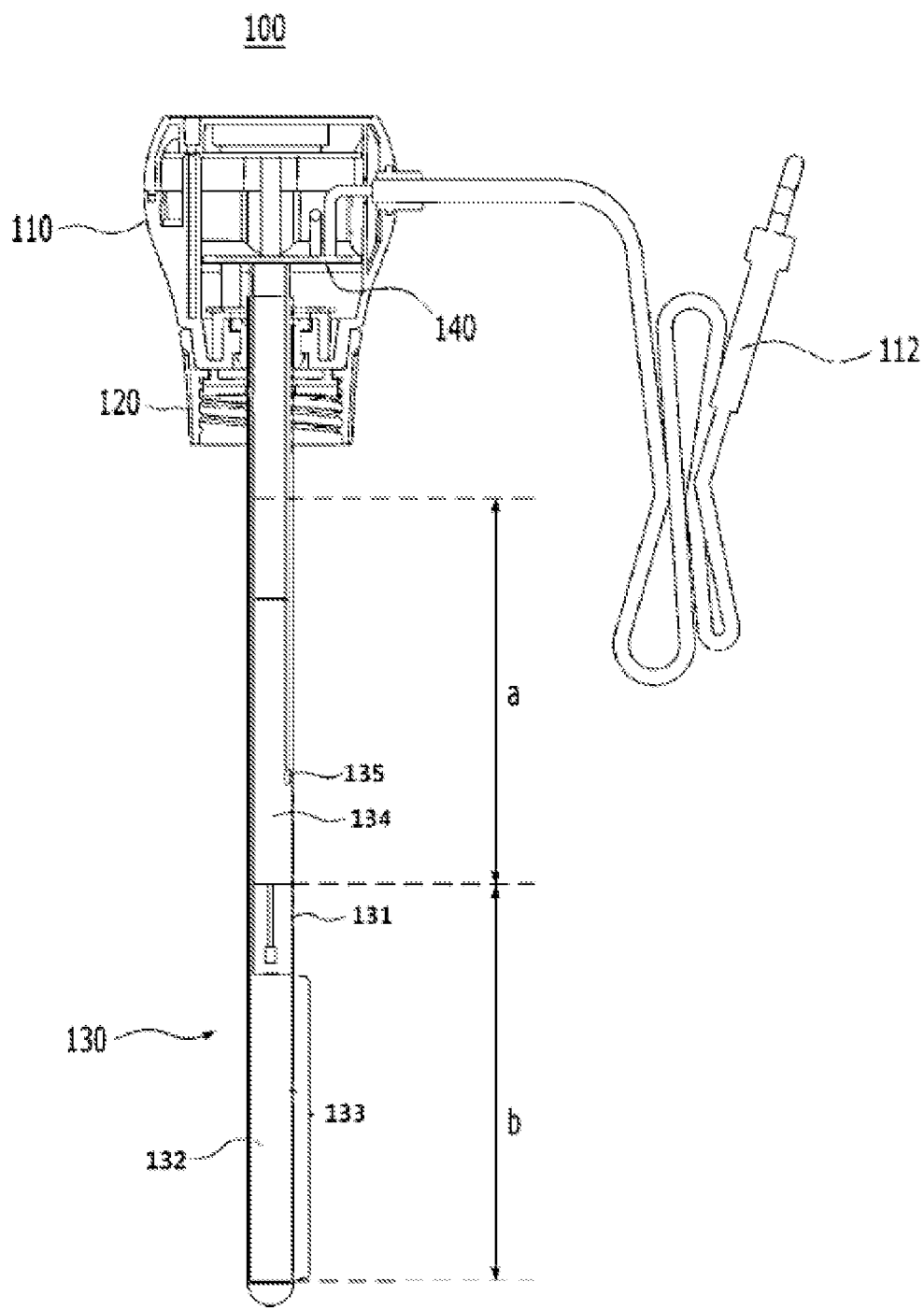
FIG. 4 is a transverse sectional view showing the yogurt fermenter of FIG. 2.

FIG. 2 is a perspective view showing a yogurt fermenter according to a first embodiment of the present invention, FIG. 3 is a schematic front view showing the yogurt fermenter of FIG. 2, which is coupled to a milk container, and FIG. 4 is a transverse sectional view showing the yogurt fermenter of FIG. 2.

Referring to FIGS. 2 to 4, a yogurt fermenter 100 includes a head part 110, a coupling part 120, a heating rod 130, and a controller 140 (See FIG. 4). The head part 110 is configured to have the controller 140 built therein to allow a heating element 132 located in an interior thereof to be controlled by the controller 140 and provides a user interface allowing a user to operate the yogurt fermenter 100. The coupling part 120 is coupled to a lower periphery of the head part 110 to couple the head part 110 to an inlet portion of a fermentation container. The heating rod 130 is coupled to the underside of the head part 110 in such a manner as to be located inside the fermentation container to supply heat for fermentation. Detailed explanations on the respective parts will be given later.

Generally, milk is stored in bottle-like containers or carton packs made of HDPE (High Density Polyethylene) and is thus sold on the market. In case of the bottle-like milk containers, generally, they have sizes of 1, 1.8, and 2.3 liters, and at this time, inlets of the milk containers and sizes of their cap are similar to each other, irrespective of milk manufacturing companies or milk quantities, so that the caps can be compatibly used. In case of the yogurt fermenter 100, the coupling part 120 can be fastened to an inlet portion 10a of a milk container 10, instead of a cap 10b (See FIG. 3), and accordingly, the yogurt fermenter 100 can be used for the milk containers having the sizes of 1, 1.8, and 2.3 liters. In detail, the yogurt fermenter 100 can make use of the milk container coming out on the market as the fermentation container. For example, as shown in FIG. 3, the cap 10b is removed from the milk container 10, and a yogurt starter is put and mixed in the milk container 10. Next, the heating rod 130 of the yogurt fermenter 100 enters the milk container 10, and then, the coupling part 120 is coupled to the inlet portion 10a of the milk container 10, thereby finishing coupling of the yogurt fermenter 100 to the milk container 10. Hereinafter, milk mixed with the yogurt starter will be called 'fermentation material', and the milk container 10 called 'fermentation container 10'.

Now, an explanation on the respective parts of the yogurt fermenter 100 according to the present invention will be in detail given below.

The head part 110 is located on the uppermost portion of the yogurt fermenter 100. If the yogurt fermenter 100 is coupled to the fermentation container 10, accordingly, the head part 110 serves to close the inlet portion 10a of the fermentation container 10. The coupling part 120 is coupled to a lower periphery of the head part 110. The coupling part 120 serves to couple the head part 110 to the inlet portion 10a of the fermentation container 10. The heating rod 130 is coupled to the underside of the head part 110. The head part 110 is configured to have the controller 140 built therein. The controller 140 serves to control heating values of the heating element 132. The head part 110 may have various shapes as well as a shape as shown in the attached drawing. More desirably, the head part 110 should be easily grasped by a user's hand and have the corresponding shape and size to the inlet portion 10a of the fermentation container 10. The head part 110 has a power cord 112 connected to a side periphery thereof. The power cord 112 serves to supply external power to the yogurt fermenter 100. According to the present invention, the power cord 112 is fixedly coupled to the head part 110, but it may be detachably coupled to the head part 110. Otherwise, power may be supplied through a battery to the yogurt fermenter 100, without having the power cord 112.

The head part 110 has a control panel 111 disposed on top thereof. The control panel 111 serves to provide a user interface for operating the yogurt fermenter 100. The control panel 111 may have various input types like button and touch types. According to the present invention, the control panel 111 includes an operating button 111a and time control buttons 111b. The operating button 111a serves to start or stop an operation of the yogurt fermenter 100. The time control buttons 111b serve to allow the user to increase or decrease fermentation time. For example, if the fermentation time is set to 8 hours, low fluidity to non fluidity yogurt can be made, and accordingly, the fermentation time can be increased or decreased according to the user's preference. The control panel 111 further has a display (not shown) for displaying elapsed fermentation time or residual fermentation time. Of course, other information (for example, outside air temperature) may be displayed on the display. In addition, the control panel 111 includes an indication lamp (not shown) for indicating states (power on/off) of the yogurt fermenter 100.

The coupling part 120 is located on the underside of the head part 110 and is thus coupled to the inlet portion 10a of the fermentation container 10. As the coupling part 120 is coupled to the inlet portion 10a of the fermentation container 10, the inlet portion 10a becomes closed by means of the head part 110. To do this, the coupling part 120 has screw grooves formed on the inner periphery thereof in such a manner as to correspond to screw threads formed on the side periphery of the inlet portion 10a of the fermentation container 10.

According to the present invention, the coupling part 120 is fixed to the head part 110. The coupling part 120 is coupled integrally with the head part 110 and is then rotated together with the head part 110. Otherwise, the coupling part 120 is coupled to the head part 110 in such a manner as to be rotated separately from the head part 110. In detail, even if the coupling part 120 is rotated and thus coupled to the inlet portion 10a of the fermentation container 10, the head part 110 and the heating rod 130 are not rotated. In this case, the power cord 112 disposed on the head part 110 is not rotated together with the coupling part 120, so that advantageously, it is not twisted.

According to the present invention, otherwise, the coupling part 120 is detachably coupled to the head part 110. In this case, the coupling part 120, which appropriately corresponds to the fermentation container 10 with the inlet portion 10a having various shapes and sizes, can be exchangeably used.

On the other hand, the yogurt fermenter 100 according to the present invention can be provided with the coupling part 120 configured in the same or similar manner as or to 'fastening part of fermenter', 'detachable fastening part', or 'rotating part and detachable fastening part' as described in Korean Patent No. 10-1521699 issued to the same applicant as the invention, and accordingly, a repeated explanation on the configuration of the coupling part 120 will be avoided.

Further, the head part 110 or the coupling part 120 can have an outside air temperature sensor (not shown) mounted thereon to measure an outside air temperature. In this case, the outside air temperature means a temperature around the fermentation container 10.

When the coupling part 120 is coupled to the inlet portion 10a of the fermentation container 10, the heating rod 130 is located inside the fermentation container 10. In detail, the heating rod 130 is insertedly put into the fermentation material. The heating rod 130 has the heating element 132 built in the lower portion thereof to directly supply heat to the fermentation material, so that the fermentation material can be fermented.

The heating rod 130 includes a casing 131, the heating element 132, and a temperature sensor 135. The casing 131 constitutes an outer shape of the heating rod 130. The casing 131 has the heating element 132 and the temperature sensor 135 built therein. The casing 131 is made of a material having a high heat transfer rate so that the heat supplied from the heating element 132 built in the casing 131 is transferred to the fermentation material existing on the outside thereof. Since the casing 131 is directly inserted into the fermentation material, further, it has excellent heat resistance, corrosion resistance, and chemical resistance. For example, the casing 131 is made of a metal material (e.g., stainless steel).

According to the present invention, the casing 131 has a shape of a rod whose top is coupled to the underside of the head part 110 in such a manner as to be extended downward. The casing 131 is coupled to the center of the underside of the head part 110. A length of the casing 131 is equal to that of the fermentation container 10. When the yogurt fermenter 100 is coupled to the fermentation container 10, in detail, the underside of the casing 131 of the heating rod 130 is close to the bottom of the fermentation container 10. For example, the underside of the casing 131 of the heating rod 130 becomes distant by about 2 cm from the bottom of the fermentation container 10.

The heating element 132 is built in the casing 131, and in detail, it is built in a lower portion of the casing 131. In this case, the lower portion of the casing 131 means a portion (corresponding to ½ in an upward direction from the underside of the casing 131) under the center portion of the casing 131, that is, a section b as shown in FIG. 4. The heating element 132 receives the power from the controller 140 built in the head part 110, and a heating value of the heating element 132 is controlled by means of the controller 140.

Further, the heating rod 130 includes an insulator 134 disposed on top of the heating element 132. The insulator 134 serves to thermally seal the top of the heating element 132, so that when the heating element 132 is heated, no heat is transferred to the head part 110, the controller 140, and the temperature sensor 135.

The temperature sensor 135 is built in the casing 131, and in detail, it is built in an upper portion of the casing 131. In this case, the upper portion of the casing 131 means a portion above the center portion of the casing 131, that is, a section a as shown in FIG. 4. If fermentation is carried out in the fermentation container 10, there is a change between a temperature at the lower portion of the fermentation material, in which the heat is received directly from the heating element 132, and a temperature at the upper portion of the fermentation material, in which the heat is received indirectly from the heating element 132. At this time, the temperature sensor 135 serves to measure the temperature at the upper portion of the fermentation material.

The controller 140 is built in the head part 110. The controller 140 serves to control an operation of the yogurt fermenter 100. In detail, the controller 140 controls heating strength and time of the heating element 132 according to a predetermined control logic on the basis of the temperature measured by the temperature sensor 135. As mentioned above, also, the controller 140 is connected to the control panel 111 to control the operation of the yogurt fermenter 100 according to the user's manipulation on the control panel 111.

The controller 140 further includes a database DB (not shown). The DB has information in advance stored to allow the controller 140 to control the heating value. The controller 140 produces a control signal to control the heating value on the basis of the information stored in the DB and the temperature information measured by the temperature sensor 135. For example, the information stored in the DB includes information on time data required up to a specific temperature, information on time data on which a specific phenomenon occurs, and so on, which will be in detail described later.

Even if not shown in the drawing, on the other hand, a protection casing is provided to keep the yogurt fermenter 100 at a given place. According to the present invention, the protection casing is coupled to the underside of the coupling part 120 in such a manner as to house the heating rod 130 therein, so that the yogurt fermenter 100 is kept at the given place. To do this, the protection casing has screw threads corresponding to the screw grooves formed on the inner periphery of the coupling part 120. The protection casing has various shapes, such as, cylindrical and polygonal shapes, without having any limitation in shape. According to the present invention, further, the yogurt fermenter 100 is directly coupled to the milk container coming out on the market and turns milk into yogurt, which gives many conveniences, but the yogurt fermenter 100 may be used in a different way. That is, it is possible that the yogurt fermenter 100 has an exclusive fermentation container capable of being coupled to the coupling part 120.

Figure 5:
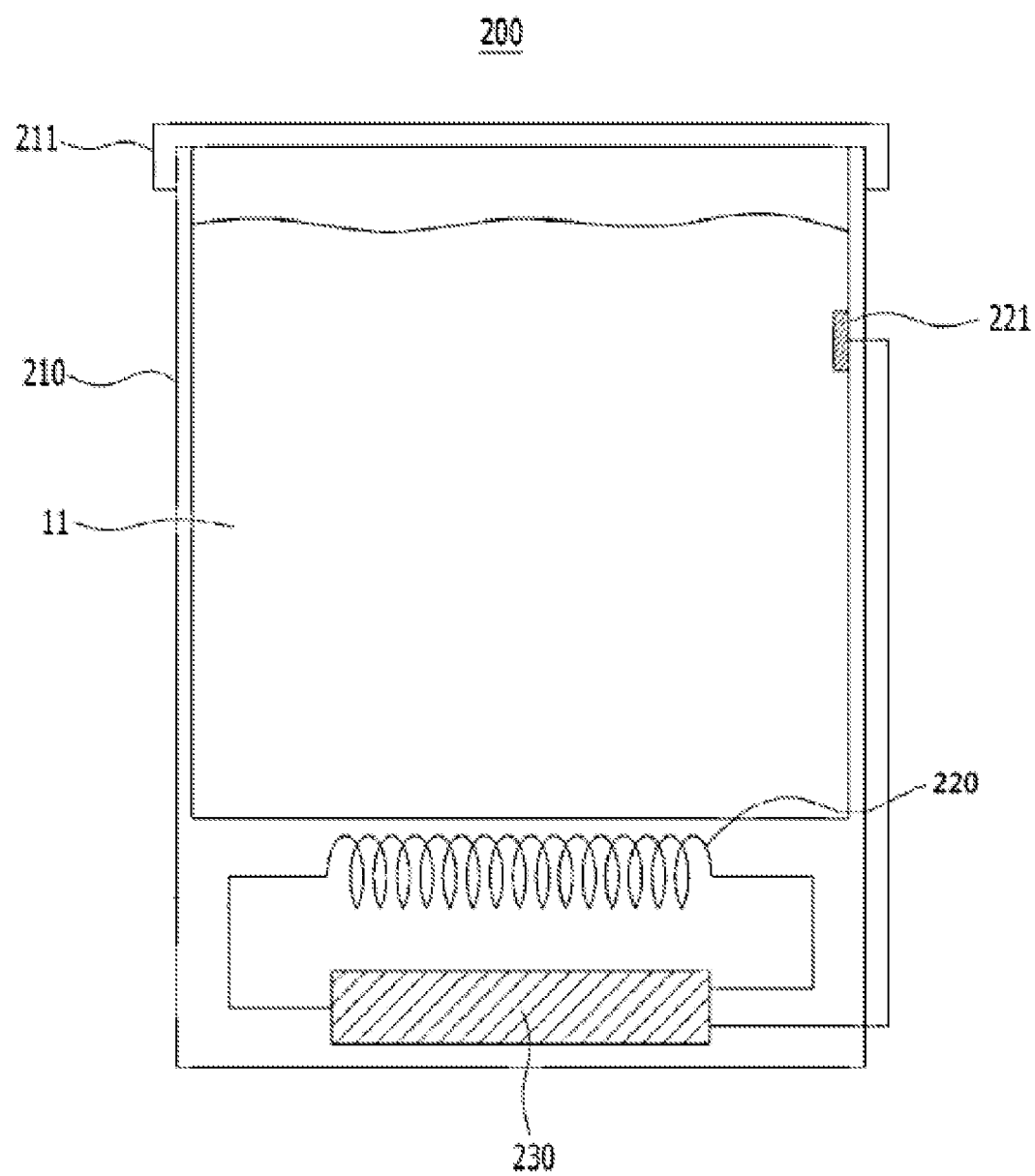
FIG. 5 is a transverse sectional view showing a yogurt fermenter according to a second embodiment of the present invention.

FIG. 5 is a transverse sectional view showing a yogurt fermenter 200 according to a second embodiment of the present invention. According to the second embodiment of the present invention, the yogurt fermenter 200 includes a body 210 and a controller 230.

The body 210 constitutes an outer shape of the yogurt fermenter 200. The body 210 has an internal space adapted to accommodate a fermentation material 11 therein. According to the present invention, the body 210 has a shape of a box whose top is open, and an openable cap 211 is disposed on top of the body 210. Even if not shown in the figure, a control panel is disposed on the side of the body 210. The control panel provides a user interface for operating the yogurt fermenter 200. The control panel is the same as or similar to that in the first embodiment of the present invention, and accordingly, a repeated explanation on the control panel will be avoided. Even if not shown in the figure, also, a power cord is connected to the side of the body 210 to supply external power.

A heating element 220 is built in a lower portion of the body 210. The heating element 220 serves to supply heat to the fermentation material 11 stored in the body 210. To do this, the body 210 is made of a material having a high heat transfer rate so that the heat supplied from the heating element 220 is transferred to the fermentation material 11 stored therein. For example, the body 210 is made of a metal material (e.g., stainless steel).

A temperature sensor 221 is built in an upper portion of the side of the body 210. The temperature sensor 221 is built in the upper portion of the body 210 with respect to the center thereof. The temperature sensor 221 serves to measure a temperature at the upper portion of the fermentation material 11. According to the second embodiment of the present invention, the temperature sensor 221 is the same or similar as or to that in the first embodiment of the present invention.

The controller 230 is built in the body 210. The controller 230 is electrically connected to the heating element 220 to supply power to the heating element 220 and also controls heating strength and time of the heating element 220 to control the heating value of the heating element 220. Further, the controller 230 is connected to the control panel to control an operation of the yogurt fermenter 200 according to the user's manipulation on the control panel.

The controller 230 controls the heating value of the heating element 220 according to a predetermined control logic on the basis of the temperature measured by the temperature sensor 221. According to the second embodiment of the present invention, the controller 230 is the same or similar as or to the controller 140 in the first embodiment of the present invention, and accordingly, a repeated explanation on the controller 230 will be avoided.

Hereinafter, an explanation on an automatic temperature control method through the controller according to the present invention will be in detail given. The automatic temperature control method is carried out through the controller of the yogurt fermenter according to the first embodiment of the present invention.

The automatic temperature control method according to the present invention includes the steps of increasing a temperature of the fermentation material to a maximum heating value, maintaining the temperature of the fermentation material in a range of a given temperature, and decreasing the heating value at an appropriate time point. In the step of increasing the temperature of the fermentation material, the temperature of the fermentation material is increased as soon as possible to the maximum heating value in which the fermentation material is not burned, so that it becomes close to an appropriate fermentation temperature. The step of maintaining the temperature of the fermentation material in a range of the appropriate fermentation temperature is carried out through various control, such as, on-off control, stepwise control, proportional control, proportional integral (PI) control, proportional differential (PD) control, and proportional integral differential (PID) control. If it is desired to maintain the temperature of the fermentation material only through any one control, in the conventional practice, the heat is accumulated around the heating part to cause the fermentation material to be burned and stuck to the heating part. Such a result can be prevented by decreasing the heating value to less than ½ of the maximum heating value at an appropriate time point before the fermentation material is burned. Hereinafter, the automatic temperature control method according to the present invention will be explained through the proportional control which is carried out in a relatively simple manner.

Before the automatic temperature control method according to the present invention is described, first, the changes in the temperature at the upper portion of the fermentation material and the temperature at the lower portion of the fermentation material, which appear at the time when yogurt fermentation is carried out only through one control way, that is, the proportional control, will be explained. In detail, a given heating value is first provided after fermentation is started, and after a temperature of the fermentation material measured by the temperature sensor (which is referred to as 'the measurement temperature of the temperature sensor') reaches a first fermentation reference temperature T1, the proportional control is carried out on the basis of a second fermentation reference temperature T2 until fermentation time is finished. If the temperature of the fermentation material is controlled through the proportional control, response of the heating value is faster and more continuous than that in the conventional stepwise control, so that advantageously, a temperature change range of the fermentation material is narrow to allow the fermentation to be more stably carried out.

Figure 6:
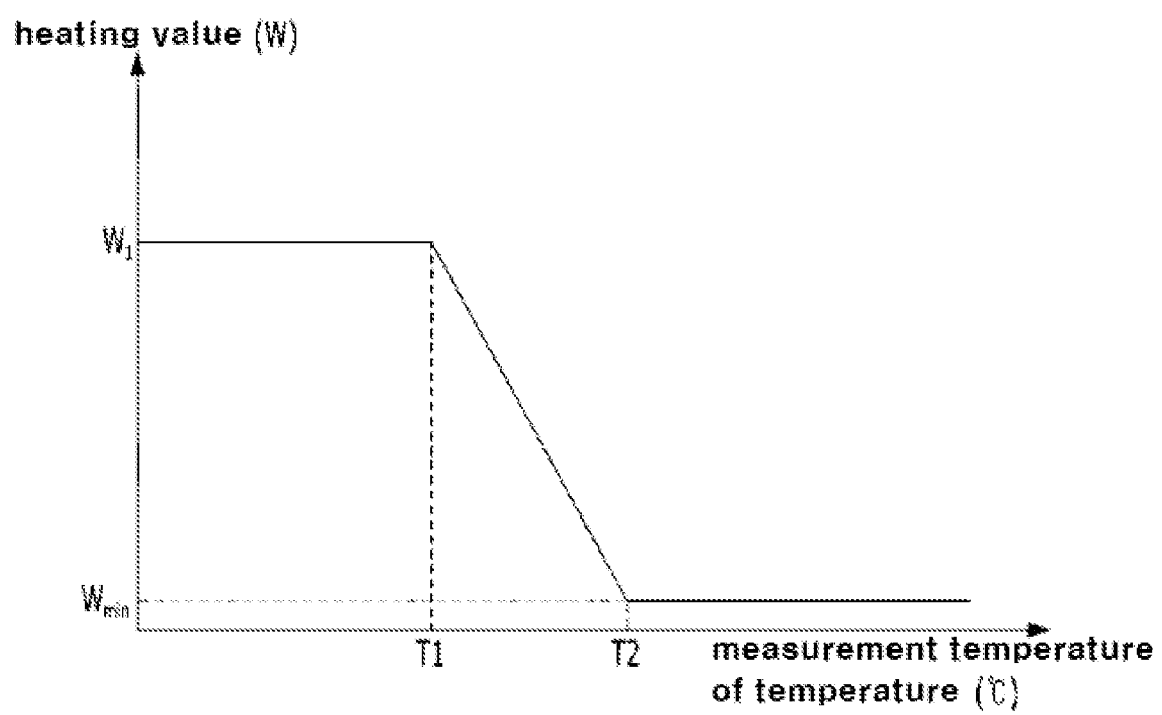
FIG. 6 is a graph showing changes in a heating value of a heating element which are determined according to temperatures measured by a temperature sensor during fermentation in the yogurt fermenter of FIG. 2 is performed through a method using proportional control.
Figure 7:
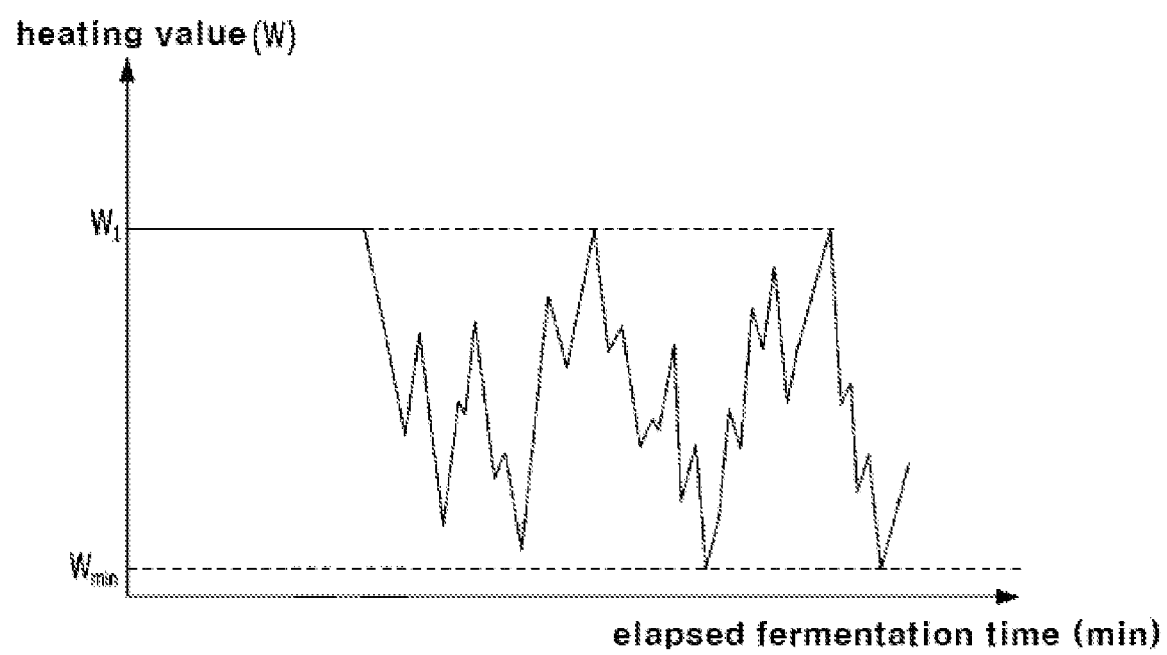
FIG. 7 is a graph showing changes in a heating value of a heating element according to elapsed time during fermentation in the yogurt fermenter of FIG. 2 is performed through a method using proportional control.
Figure 8:
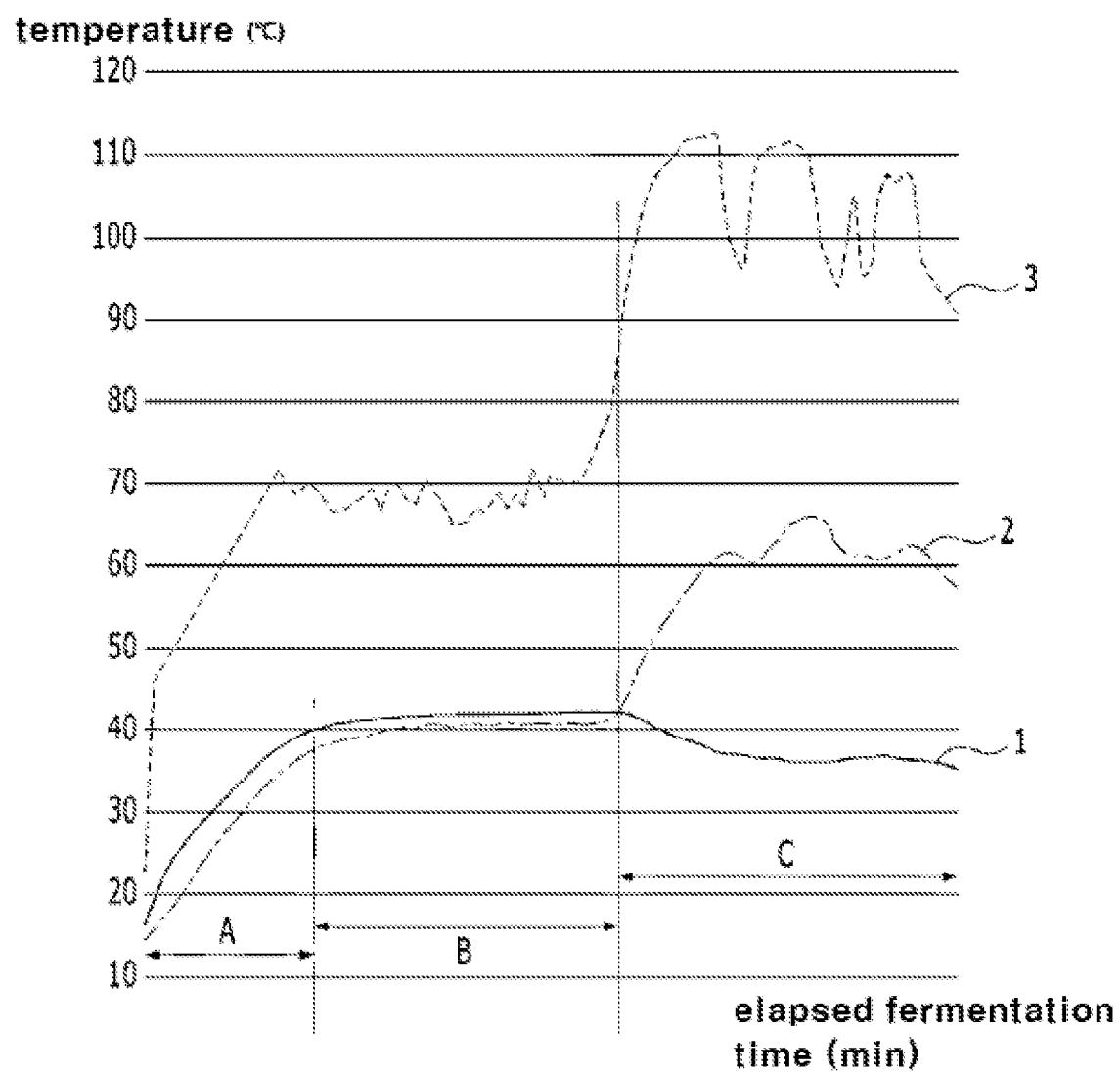
FIG. 8 is a graph showing changes in upper and lower temperatures of a fermentation material and in a surface temperature of a heating element during fermentation in the yogurt fermenter of FIG. 2 is performed through a method using proportional control.

FIG. 6 is a graph showing changes in a heating value of the heating element 132 which are determined according to temperatures measured by a temperature sensor during fermentation in the yogurt fermenter of FIG. 2 is performed through a method using proportional control, FIG. 7 is a graph showing changes in a heating value of the heating element 132 according to elapsed time during fermentation in the yogurt fermenter of FIG. 2 is performed through a method using proportional control, and FIG. 8 is a graph showing changes in upper and lower temperatures of a fermentation material and in a surface temperature of the heating part 133 during fermentation in the yogurt fermenter of FIG. 2 is performed through a method using proportional control. The temperature at the upper portion of the fermentation material is an average temperature at the upper portion of the fermentation material, that is, at the half thereof, which is measured at an intermediate distance between the heating rod 130 and the outer periphery of the fermentation container 10 at a height where the temperature sensor is located, and the temperature at the lower portion of the fermentation material is an average temperature at the lower portion of the fermentation material, that is, at the half thereof, which is a measured temperature at an intermediate distance between the heating rod 130 and the outer periphery of the fermentation container 10 at a height where the heating element 132 is located. Further, the temperature sensor 135 in the yogurt fermenter 100 according to the present invention is located at the upper portion of the fermentation material, and accordingly, the measurement temperature of the temperature sensor is a temperature at the upper portion of the fermentation material measured through the temperature sensor 135.

Referring to FIG. 6, an X axis indicates a measurement temperature (° C.) of the temperature sensor, and a Y axis indicates a heating value W (watt). According to the proportional control, if the measurement temperature of the temperature sensor is lower than the first fermentation reference temperature T1, the heating element 132 is controlled to constantly supply a first heating value (indicated by $W_1$ in FIG. 6), and if the measurement temperature of the temperature sensor is higher than the first fermentation reference temperature T1 and lower than the second fermentation reference temperature T2, the heating element 132 is controlled to proportionally decrease the heating value according to a temperature difference on the basis of the second fermentation reference temperature T2. If the measurement temperature of the temperature sensor is higher than the second fermentation reference temperature T2, further, the heating element 132 is controlled to constantly supply a minimum heating value (indicated by $W_{min}$ in FIG. 6), and if the minimum heating value $W_{min}$ is set to 0, heating is cut off at the time when the measurement temperature of the temperature sensor is higher than the second fermentation reference temperature T2.

Referring to FIG. 7, an X axis indicates time (minutes) elapsed after fermentation is started, and a Y axis indicates a heating value W (watt). According to the proportional control, if the measurement temperature of the temperature sensor is lower than the first fermentation reference temperature T1, a first heating value (indicated by $W_1$ in FIG. 7) is supplied. If the measurement temperature of the temperature sensor is higher than the first fermentation reference temperature T1, a heating value is supplied in proportion to a difference between the measurement temperature of the temperature sensor and the second fermentation reference temperature T2, and accordingly, the heating value is changed between the first heating value $W_1$ and the minimum heating value $W_{min}$.

If the yogurt fermentation is made through the proportional control, the graph as shown in FIG. 8 is obtained. Referring to FIG. 8, an X axis indicates time (minutes) elapsed after the fermentation is started, and a Y axis indicates a temperature (° C.). Further, a solid line 1 indicates temperature changes at the upper portion of the fermentation material, a dashed dotted line 2 temperature changes at the lower portion of the fermentation material, and a dotted line 3 temperature changes at the surface of the heating part 133. As the first heating value $W_1$ is uniformly supplied at an initial fermentation step where a temperature of the fermentation material is low (which is a section A in FIG. 8), temperatures at the upper and lower portions of the fermentation material are increased at a similar speed to each other. If the temperature of the fermentation material is increased to allow the measurement temperature of the temperature sensor to reach the first fermentation reference temperature T1, the heating value is increased or decreased within the range between the first heating value $W_1$ and the minimum heating value $W_{min}$ so that the increase in the temperature of the fermentation material is stopped to allow the temperature of the fermentation material to be maintained within a relatively small range. The fermentation material has fluidity at the initial fermentation step (the section A) and the intermediate fermentation step (the section B), and also, the fermentation material around the heating element 132 at the lower portion of the fermentation container 10 becomes warm, so that convection occurs dynamically toward the upper portion of the fermentation container 10. Accordingly, the upper portion of the fermentation material has a relatively higher temperature than the lower portion thereof. In these steps, much heat is removed from the heating element 132 by means of the convection of the fermentation material, so that the surface temperature of the heating part 133 is not raised and the fermentation material is not burned and stuck to the heating part 133.

As the fermentation is carried out, however, the fluidity of the fermentation material is gradually decreased, and if the fermentation reaches a final fermentation step (which is a section C in FIG. 8), the fermentation material is in a low fluidity or non fluidity state, so that it is hard to generate convection through heat and only a portion of the heat is limitedly transferred to the upper portion of the fermentation container 10 through conduction of the fermentation material. Accordingly, the supply of heat to the upper portion of the fermentation container 10 where the temperature sensor 135 is located is relatively decreased, and as a result, the temperature at the upper portion of the fermentation material becomes slowly decreased. Further, heat around the heating element 132 is accumulated at the lower portion of the fermentation container 10 at which the heating part 133 is located, and accordingly, the temperature at the lower portion of the fermentation material is increased at a relatively fast speed, so that the temperatures at the upper and lower portions of the fermentation material become reversed (which is generated at a time point X in FIG. 8). After that, a temperature difference at the upper and lower portions of the fermentation material becomes increased as time is elapsed at the final fermentation step (the section C), which is bigger than that at the initial fermentation step and the intermediate fermentation step.

In this case, it should be noted that the surface temperature of the heating part 133 is drastically increased before about 30 minutes from the time point X (which is referred to as 'upper and lower temperature reversing time point') where the temperatures at the upper and lower portions of the fermentation material become reversed, and before and after the upper and lower temperature reversing time point, the fermentation material gets burned and stuck to the surface of the heating part 133. Since the temperature at the upper portion of the fermentation material is decreased at the final fermentation step (the section C), especially, the temperature measured by the temperature sensor 135 is decreased, and accordingly, the heating element 132 continuously increases the heating value. In this case, heat conduction through the fermentation material occurs limitedly, so that the heat is accumulated around the heating part 133. Accordingly, the surface temperature of the heating part 133 becomes high to cause the fermentation material to be burned and stuck to the heating part 133. Like this, the fermentation material burned and stuck to the heating part 133 has to be removed from the heating part 133 through an abrasive brush, which causes many inconveniences in the use for the yogurt fermenter.

If the first fermentation reference temperature T1 and the second fermentation reference temperature T2 are decreased to prevent the fermentation material from being burned and stuck to the heating part 133 at the final fermentation step (the section C), heat is not sufficiently supplied to the fermentation material at the initial fermentation step and the intermediate fermentation step, so that the fermentation material is not sufficiently fermented. According to the proportional control, therefore, it is difficult to prevent the fermentation material from being burned and stuck to the heating part 133.

If the fermentation material is fermented through the proportional control, further, the fermentation may be influenced by an outside air temperature of the fermentation container 10. The lower the outside air temperature of the fermentation container 10 is, the higher the heat discharged to the outside from the fermentation container 10 are. Accordingly, increasing speeds of the temperatures at the upper and lower portions of the fermentation material at the initial fermentation step (the section A) become low, and time (a length of the section A in FIG. 8) during which the measurement temperature of the temperature sensor reaches the first fermentation reference temperature T1 becomes long. This is because the heating value is constantly maintained to the first heating value $W_1$ during the initial fermentation step (the section A), irrespective of the outside air temperature. In this section, the temperature at the upper portion of the fermentation material is kept higher than that at the lower portion thereof. Only if the measurement temperature of the temperature sensor reaches the first fermentation reference temperature T1, the temperatures at the upper and lower portions of the fermentation material become stable in a constant range, irrespective of the outside air temperature, and time elapsed up to the upper and lower temperature reversing time point X after the measurement temperature of the temperature sensor reaches the first fermentation reference temperature T1 is not greatly influenced by the outside air temperature. This is because an average heating value is increased through temperature control if the outside air temperature is low. The lower the outside air temperature is, as a result, the longer the time elapsed up to the upper and lower temperature reversing time point X after the fermentation is started is. At the final fermentation step (the section C) after the upper and lower temperature reversing time point X, the lower the outside air temperature is, the slower the increasing speeds of the temperatures at the upper and lower portions of the fermentation material are and the faster the decreasing speeds thereof are. In more detail, the lower the outside air temperature is, during the final fermentation step (the section C), the faster the decreasing speed of the temperature at the upper portion of the fermentation material is. As the measurement temperature of the temperature sensor is rapidly decreased, the heating value quickly reaches the time point increasing to the first heating value. The lower the outdoor air temperature is, accordingly, the more the fermentation material is burned and stuck to the heating part 133.

The process of changing the temperatures at the upper and lower portions of the fermentation material and the surface temperature of the heating part 133 has been explained on the basis of the temperature control of the fermentation material through the proportional control, but even if the temperature of the fermentation material using only one control selected from the on-off control, stepwise control, proportional control, proportional integral control, proportional differential control, and proportional integral differential control is continuously controlled, in view of the principle of the control, the temperatures at the upper and lower portions of the fermentation material and the surface temperature of the heating part 133 are changed in the similar patterns to those in other control ways, thereby failing to prevent the fermentation material from being burned and stuck to the heating part 133.

So as to solve the above-mentioned problems occurring in the yogurt fermenter according to the present invention, therefore, a yogurt fermentation process is divided into a first fermentation step and a second fermentation step, and on the basis of the information stored in the controller 140 and the temperature measured by the temperature sensor 135, the heating value of the heating element 132 is controlled. So as to achieve optimal yogurt fermentation, it is known that a milk mixture has to be kept at a temperature above or below 42° C. It is also recognized that a yogurt fermenter for household is operated for 8 hours to make yogurt. Hereinafter, the appropriate temperature range of 41 to 42° C. for making the yogurt is called 'appropriate fermentation temperature range'. So as to make optimal yogurt within 8 hours, it is important that after a temperature of the fermentation material is increased as soon as possible, the temperature has to be kept to the appropriate fermentation temperature range. In the description, also, a capacity of the fermentation container 10 is 1.8 liter unless a specific explanation is given.

Figure 9:
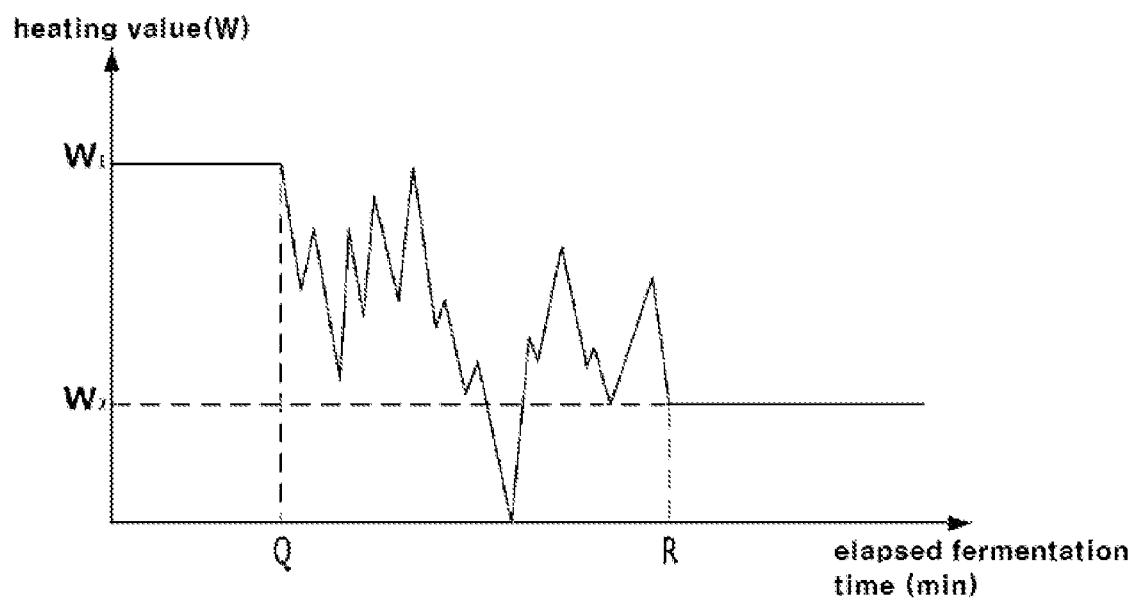
FIG. 9 is a graph showing changes in a heating value of a heating element according to elapsed time during fermentation in the yogurt fermenter of FIG. 2 is performed through a temperature control method according to the present invention.
Figure 10:
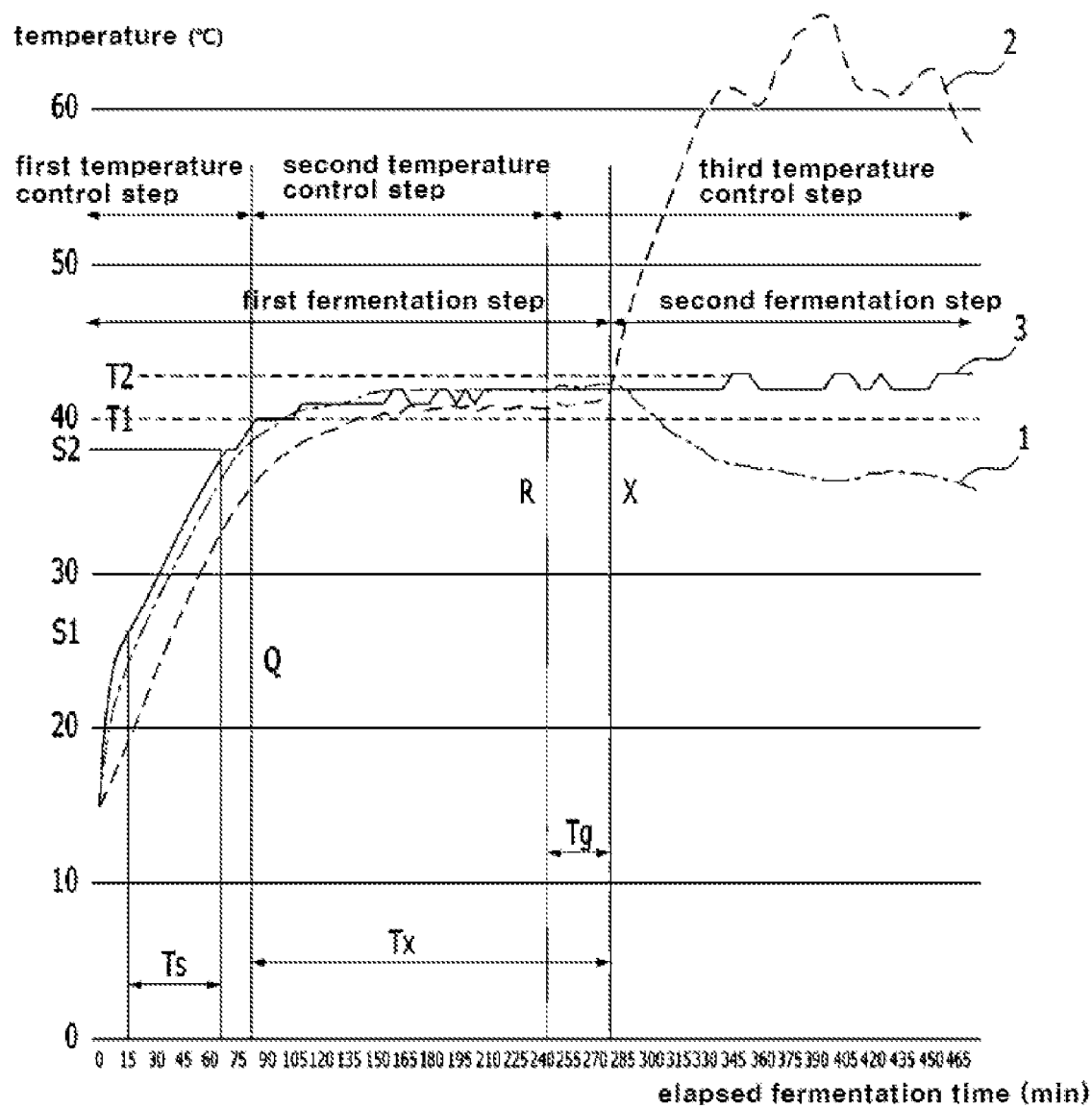
FIG. 10 is a graph showing changes in upper and lower temperatures of a fermentation material and in a temperature measured by the temperature sensor during fermentation in the yogurt fermenter of FIG. 2 is performed through a method using proportional control.

Now, a temperature control method for the yogurt fermenter according to the present invention will be explained with reference to FIGS. 9 and 10. FIG. 9 is a graph showing changes in a heating value of the heating element 132 according to elapsed time during fermentation in the yogurt fermenter of FIG. 2 is performed through the temperature control method according to the present invention, and FIG. 10 is a graph showing changes in upper and lower temperatures of the fermentation material and in a temperature measured by the temperature sensor during fermentation in the yogurt fermenter of FIG. 2 is performed through a method using proportional control.

Referring to FIG. 9, a first heating value (indicated by $W_1$ in FIG. 9) is constantly supplied until the measurement temperature of the temperature sensor after the fermentation is started reaches the first fermentation reference temperature T1 (which is indicated by Q in FIGS. 9 and 10 and called 'a time point of reaching the first fermentation reference temperature'), and after that, a heating value is supplied in proportion to a difference between the measurement temperature of the temperature sensor and the second fermentation reference temperature T2 up to a specific time point (indicated by R in FIG. 9 and called 'a time point of converting temperature control') from the time point Q of reaching the first fermentation reference temperature. Further, a second heating value (indicated by $W_2$ in FIG. 9), which is determined in a range of 0 to ½ of the first heating value $W_1$, is constantly supplied up to a time point of finishing the fermentation from the time point R of converting temperature control.

An explanation on the principle of the temperature control method of the yogurt fermenter according to the present invention will be given with reference to FIG. 10. As shown in FIG. 10, an X axis indicates time (minutes) elapsed after fermentation is started, and a Y axis indicates a temperature (° C.). Further, a dashed dotted line 1 indicates temperature changes at the upper portion of the fermentation container, a dotted line 2 temperature changes at the lower portion of the fermentation container, and a solid line 3 changes in the measurement temperature of the temperature sensor.

First, a first temperature control step (See FIG. 10) corresponding to the initial fermentation step (the section A in FIG. 8) will be explained. The first temperature control step indicates the time elapsed up to the time point Q of reaching the first fermentation reference temperature after the fermentation is started, that is, the time during which the measurement temperature of the temperature sensor is increased up to the first fermentation reference temperature T1. During the first temperature control step, the first heating value $W_1$ is constantly supplied, and as shown in FIG. 10, also, the temperatures at the upper and lower portions of the fermentation material and the measurement temperature of the temperature sensor are continuously increased. During the first temperature control step, as mentioned above, the temperature at the upper portion of the fermentation material is higher than that at the lower portion of the fermentation material. The first heating value $W_1$ is a maximum heating value generated from the heating element 132 so as to obtain an optimal fermentation result. According to the present invention, the first heating value $W_1$ is in a range of 20 to 50 W. If the first heating value $W_1$ is less than 20 W, the increase in the temperature of the fermentation material becomes slow, thereby failing to achieve good fermentation, and in serious cases, the temperature of the fermentation material may be not increased anymore. If the first heating value $W_1$ is more than 50 W, the fermentation material becomes burned and stuck to the heating part 133 or overshooting occurs from the heating element 132, thereby making it hard to control the temperature of the fermentation material. The overshooting is caused when the heating element 132 is overheated so that even if power is cut off, heat is kept for a while from the heating element 132 to cause the temperature of the fermentation material to be increased. Furthermore, if the first heating value $W_1$ is too high, safety accidents occur to cause a user to suffer burns. Actually, the first heating value $W_1$ may be varied according to the capacity of the fermentation container. For example, if 1.8 liter milk container which is used most is used as the fermentation container, the first heating value $W_1$ is desirably 30 W.

Next, a second temperature control step (See FIG. 10) will be explained. As shown in FIGS. 9 and 10, the heating value is controlled through the proportional control on the basis of the second fermentation reference temperature T2 as a reference temperature between the time point Q of reaching the first fermentation reference temperature and the time point R of converting temperature control, and the temperature of the fermentation material is kept close to the appropriate fermentation temperature range. In detail, during the measurement temperature of the temperature sensor is increased from the first fermentation reference temperature T1 to the second fermentation reference temperature T2, the heating value is decreased from the first heating value $W_1$ to the minimum heating value $W_{min}$ in proportion to a difference between the second fermentation reference temperature T2 and the measurement temperature of the temperature sensor. In more detail, if the measurement temperature of the temperature sensor is increased, the heating value of the heating element 132 becomes low, and contrarily, if the measurement temperature of the temperature sensor is decreased, the heating value of the heating element 132 becomes high. If the measurement temperature of the temperature sensor is the second fermentation reference temperature T2, the minimum heating value $W_{min}$ is desirably 0 so as to perform fast temperature control. During the second temperature control step, the measurement temperature of the temperature sensor is repeatedly increased and decreased in a given range having the first fermentation reference temperature T1 and the second fermentation reference temperature T2, and the temperatures at the upper and lower portions of the fermentation material are almost constantly maintained. During the second temperature control step, also, the temperature at the upper portion of the fermentation material is kept higher than that at the lower portion thereof.

It is advantageous that the first fermentation reference temperature T1 does not have any big difference from the appropriate fermentation temperature range. Since the heating value is decreased from the time point where the measurement temperature of the temperature sensor is higher than the first fermentation reference temperature T1, the bigger the difference between the first fermentation reference temperature T1 and the appropriate fermentation temperature range is, the longer the temperature of the fermentation material reaches the appropriate fermentation temperature range. Also, the second fermentation reference temperature T2 is the upper limit in the changes of the measurement temperature of the temperature sensor, so that advantageously, it is relatively higher than the appropriate fermentation temperature range. As mentioned above, the first fermentation reference temperature T1 does not have any big difference from the appropriate fermentation temperature range. In this case, if there is a big difference between the first fermentation reference temperature T1 and the second fermentation reference temperature T2, it is hard to control the temperature of the fermentation material through the proportional temperature control. For example, if it is assumed that the first heating value $W_1$ is 30 W, the first fermentation reference temperature T1 is 33° C., and the second fermentation reference temperature T2 is 43° C., a temperature difference is 10° C., so that through the proportional temperature control, only 3 W heating value can be controlled with respect to a temperature change of 1° C. According to the present invention, the heating element 132 of the yogurt fermenter is located at the lower portion of the fermentation container 10, and contrarily, the temperature sensor 135 is located inside the casing 131 at the upper portion of the fermentation container 10, so that a distance between the heating element 132 and the temperature sensor 135 and a time difference therebetween may exist. Accordingly, it is difficult to handle the temperature changes of the fermentation material in real time through the control of the heating value in a small range with respect to the temperature changes, which causes the temperature changes of the fermentation material to become big.

If the first fermentation reference temperature T1 and the second fermentation reference temperature T2 are set to the same value as each other, the second temperature control step is on-off control based on the second fermentation reference temperature T2. In detail, if the measurement temperature of the temperature sensor is higher than the second fermentation reference temperature T2, heating is cut off, and if the measurement temperature of the temperature sensor is lower than the second fermentation reference temperature T2, the first heating value $W_1$ is supplied. If the second temperature control step becomes the on-off control, changes in the surface temperature of the heating part 133 become bigger than those in case of the proportional control.

According to the present invention, the first fermentation reference temperature T1 and the second fermentation reference temperature T2 are set in the range of 30 to 50° C. under the condition where the second fermentation reference temperature T2 is equal to or greater than the first fermentation reference temperature T1, and in detail, a difference between the first fermentation reference temperature T1 and the second fermentation reference temperature T2 is desirably in the range of 0 to 7° C. In more detail, desirably, the first fermentation reference temperature T1 is 40° C., and the second fermentation reference temperature T2 is 43° C. For the convenience of the explanation, hereinafter, the first fermentation reference temperature T1 is set to 40° C., the second fermentation reference temperature T2 is to 43° C., the first heating value $W_1$ is to 30 W, and the minimum heating value $W_{min}$ is to 0 W. In this case, if the measurement temperature of the temperature sensor is lower than 40° C., 30 W as a maximum heating value is kept, if it is 41° C., 20 W is kept, if it is 42° C., 10 W is kept, and if it is greater than 43° C., 0 W is supplied. At this time, if the measurement temperature of the temperature sensor is decreased to 40° C. from 41° C., the heating value is increased by 10 W to 30 W from 20 W to cause the temperature of the fermentation material to be raised. If the measurement temperature of the temperature sensor is increased to 43° C. from 42° C., the heating value is decreased to 0 W from 10 W to cause the temperature of the fermentation material to be lowered. Accordingly, the temperature of the fermentation material can be controlled in the range of 41 to 42° C. If the first fermentation reference temperature T1 and the second fermentation reference temperature T2 are set to the same temperature as each other, for example, to 42° C., the temperature control method at the second temperature control step is the on/off control based on the reference temperature of 42° C.

So as to allow the temperature control method to be converted into a third temperature control step (See FIG. 10), the temperature control method is converted at the time point of converting the temperature control (indicated by R in FIG. 10), and accordingly, the heating value has to be lowered. Now, an explanation on a conversion time point and a method for determining the heating value will be given. If the yogurt fermentation is carried out through the proportional control, the time elapsed up to the upper and lower temperature reversing time point (indicated by X in FIG. 10) from the time point where the fermentation is started is called the first fermentation step, and the time elapsed up to the time point where the fermentation is finished from the upper and lower temperature reversing time point is called the second fermentation step. At the first fermentation step, the fermentation material has high fluidity, and the fermentation material whose temperature is raised by the heat generated from the heating element 132 located at the lower portion of the fermentation container 10, so that through convection, the temperature at the upper portion of the fermentation container 10 is higher than that at the lower portion thereof. At the first fermentation step, accordingly, the upper portion of the fermentation container 10 is more fermented than the lower portion thereof. After that, the fluidity of the fermentation material becomes low, and the upper and lower temperature reversing time point X appears. At the second fermentation step, the fluidity of fermentation material is lost, and the heating value of the heating element 132 is accumulated around the heating part 133 to cause the surface temperature of the heating part 133 to become high, so that as mentioned above, the fermentation material becomes burned and stuck to the heating part 133. At this time, as shown in FIG. 8, the surface temperature of the heating part 133 starts to be increased before 30 minutes at the time point where the temperatures at the upper and lower portions of the fermentation material are reversed, and the temperature control method is converted before the surface temperature of the heating part 133 is increased, so that the heating value is in advance decreased to a degree where heat is not accumulated around the heating part 133. Even if the upper and lower temperature reversing time point X appears, accordingly, the fermentation material is not burned and stuck to the heating part 133. To do this, the temperature control method is converted into the time point R before predetermined spare time Tg from the upper and lower temperature reversing time point X, thereby lowering the heating value. In this case, the spare time Tg is greater than 0 and has a smaller value than the time elapsed from the time point Q of reaching the first fermentation reference temperature up to the upper and lower temperature reversing time point X. The lower the outside air temperature is, the more heat is discharged to the outside of the fermentation container 10. Accordingly, at the third temperature control step after the time point R of converting temperature control, the second heating value $W_2$ is a little lowered, and if the outside air temperature is high, the second heating value $W_2$ is much lowered, so that the fermentation material is not burned and stuck to the heating part 133 and the lower fermentation material can be well fermented. At this time, if the outside air temperature is extremely high after the time point R of converting temperature control and is thus close to the appropriate fermentation temperature range, for example, is higher than 35° C., the temperature of the fermentation material can be kept increased only with the second heating value $W_2$ which is just ⅒ of the first heating value $W_1$, so that if the measurement temperature of the temperature sensor is higher than the second fermentation reference temperature T2, heating is cut off.

To do this, the controller 140 of the yogurt fermenter according to the present invention further includes the DB, and the DB has information on second time Tx regarding the upper and lower temperature reversing time point X, information on first time Ts during which the measurement temperature of the temperature sensor increases within a specific temperature range, and information on the second heating value $W_2$.

First, the DB stores in advance the information on the upper and lower temperature reversing time point X at which the temperatures at the upper and lower portions of the fermentation material are reversed. The information on the upper and lower temperature reversing time point X is stored as time (indicated by Tx in FIG. 10 and is called 'second time') elapsed from the time point Q at which the measurement temperature of the temperature sensor reaches the first fermentation reference temperature T1 up to the upper and lower temperature reversing time point X. The reason why the time is not stored as the time elapsed from the time point where the fermentation is started is that an initial temperature of the fermentation material can be varied when the fermentation is started, which gives an influence on the time elapsed up to the upper and lower temperature reversing time point X. On the other hand, the upper and lower temperature reversing time point X is influenced by the outside air temperature at which the fermentation container is located, and accordingly, the information on the upper and lower temperature reversing time point X has to be stored by outside air temperature. For example, the DB includes data on the second time elapsed from the time point Q of reaching the first fermentation reference temperature T1, that is, 40° C., up to the upper and lower temperature reversing time point X. At this time, the time has a unit of minutes or seconds.

The outside air temperature can be measured by means of an outside air temperature sensor (not shown), and otherwise, it may be estimated with the time during which the measurement temperature of the temperature sensor increases within a specific temperature range at the first temperature control step. At the first temperature control step, the heating value is constant as the first heating value $W_1$, and the lower the outside air temperature is, the more heat is discharged to the outside of the fermentation container 10, so that the increasing speed of the measurement temperature of the temperature sensor becomes slow. Contrarily, if the outside air temperature becomes high, the increasing speed of the measurement temperature of the temperature sensor becomes fast. Accordingly, the time during which the measurement temperature of the temperature sensor increases within the specific temperature range is inversely proportional to the outside air temperature, and if the time during which the measurement temperature of the temperature sensor reaches the specific temperature range is measured, the outside air temperature can be estimated from the measured time. According to the present invention, the DB further includes data on time (indicated by Ts in FIG. 10 and is called 'first time') during which the measurement temperature of the temperature sensor is increased from a first temperature (indicated by S1) to a second temperature (indicated by S2) with respect to respective outside air temperatures. At this time, the time has a unit of minutes or seconds. If the first temperature S1 is substantially lower than a room temperature, the fermentation material absorbs the heat from the heating part 133 as well as the surrounding space to cause the measurement temperature of the temperature sensor to be drastically increased, thereby producing a big error. Accordingly, the first temperature S1 is desirably set to a room temperature. The second temperature S2 has to be lower than the first fermentation reference temperature T1. If the second temperature S2 is higher than the first fermentation reference temperature T1, the heating value is decreased so that a linear relation between the changes in the measurement temperature of the temperature sensor and the time Ts during which the measurement temperature of the temperature sensor reaches the specific temperature range may be broken. Also, the bigger the difference between the first temperature S1 and the second temperature S2 is, the smaller the error in measuring the time Ts is. Therefore, the second temperature S2 is a maximum high temperature, while being not higher than the first fermentation reference temperature T1. That is, the second temperature S2 is desirably set to the same temperature as the first fermentation reference temperature T1. For example, if the first fermentation reference temperature T1 is 40° C., the first temperature S1 is in the range of 20 to 35° C., and the second temperature S2 is higher than the first temperature S1 and lower than the first fermentation reference temperature T1. That is, the second temperature S2 is in the range of 25 to 40° C. Hereinafter, it is assumed that the first temperature S1 is 27° C., the second temperature S2 is 40° C., the first fermentation reference temperature T1 is 40° C., and the second fermentation reference temperature T2 is 43° C.

According to the present invention, the DB includes data on the second heating value. The second heating value (indicated by $W_2$ in FIG. 9) is matched with the respective outside air temperature conditions and is thus determined through preliminary tests. The DB includes the information on the second heating value $W_2$ determined in the range of 0 to ½ of the first heating value $W_1$. If the outside air temperature becomes low, the second heating value $W_2$ becomes high, and if the outside air temperature becomes high, the second heating value $W_2$ becomes low. For example, if the first heating value $W_1$ is 30 W, the second heating value $W_2$ is in the range of 0 to 15 W.

Examples of the data on the first time Ts, the second time Tx, and the second heating value $W_2$ are suggested in Table 1. The data in Table 1 is measured through repeated tests under the condition where the fermentation container has a capacity of 1.8 liter, and the data on the first time Ts, the second time Tx, and the second heating value $W_2$ is not limited as values listed in Table 1.

TABLE 1

| Outside air Temperature (° C.) | First time data (27° C. → 40° C.) | Second time data (40° C. → upper and lower temperature reversing time point) | Second heating value data |
|---|---|---|---|
| 18 | 100 min | 155 min | 11 W |
| 21 | 90 min | 139 min | 9 W |
| 23 | 80 min | 150 min | 8 W |
| 25 | 71 min | 140 min | 7 W |
| 28 | 69 min | 135 min | 7 W |
| 31 | 63 min | 147 min | 6 W |
| 35 | 55 min | 150 min | 6 W |

For example, if the outside air temperature is 23° C., 80 minutes (the first time Ts) are elapsed until the measurement temperature of the temperature sensor in the fermentation container is increased to 40° C. from 27° C., and if the first fermentation reference temperature T1 is 40° C., 150 minutes (the second time Tx) are elapsed from the time point Q where the measurement temperature of the temperature sensor reaches 40° C. up to the upper and lower temperature reversing time point X. Under the same outside air temperature, further, if the second heating value $W_2$ is 8 W, the fermentation result is good.

According to the present invention, the controller of the yogurt fermenter makes use of the data stored in the DB to control the heating value of the heating element 132. In detail, the controller measures the first time Ts during which the measurement temperature of the temperature sensor is increased to the second temperature S2 (for example, 40° C.) from the first temperature S1 (for example, 27° C.). Since the first temperature S1 and the second temperature S2 are lower than the first fermentation reference temperature T1, the heating value of the heating element 132 is kept at the first heating value $W_1$. If the controller measures the first time Ts, it directly matches the data on the first time Ts stored in the DB with the measured first time Ts, and otherwise, it estimates the outside air temperature through interpolation. For example, if a value of the first time Ts measured by the controller on the basis of Table 1 is 80 minutes, the outside air temperature is estimated as 23° C. If the outside air temperature is estimated, in the same manner as above, a value of the second time Tx through Table 1 can be estimated. In detail, if the measured first time Ts is 80 minutes, it is estimated that the outside air temperature is 23° C., and also, it is estimated that the upper and lower temperature reversing time point X occurs after about 150 minutes (Tx) from the time point where the measurement temperature of the temperature sensor reaches 40° C., that is, the first fermentation reference temperature T1.

Next, the controller extracts 'the time point of converting temperature control' at which the temperature control method is converted to allow the heating element 132 to supply the second heating value $W_2$. In this case, the time point (indicated by R in FIG. 10) of converting temperature control is a time point coming earlier by the spare time (indicated by Tg in FIG. 10) than the upper and lower temperature reversing time point X. In more detail, the spare time Tg is in the range of 0 to 90 minutes, and desirably, it is 60 minutes. This is because the surface temperature of the heating part 133 is drastically increased from about 30 minutes before the upper and lower temperature reversing time point X. In consideration of the time point where the surface temperature of the heating part 133 is increased and the error in tests, the time before the upper and lower temperature reversing time point X is sufficiently given, and accordingly, the temperature control conversion time point R is the time point coming earlier by about 60 minutes than the upper and lower temperature reversing time point X. If the temperature control conversion time point R is too fast, the time during the appropriate fermentation temperature range is maintained at the second temperature control step is reduced so that the fermentation is not achieved well. When the outside air temperature is 23° C., for example, if 30 W ($W_1$) heating value is supplied after the fermentation is started, the controller performs the proportional temperature control from the time point where the measurement temperature of the temperature sensor reaches 40° C., that is, the first fermentation reference temperature T1. Through the controller, next, 8 W of the second heating value $W_2$ is supplied after 90 minutes (=150 min−60 min) from the time point Q of reaching the first fermentation reference temperature, so that the fermentation material is not burned and stuck to the heating part 133, and the upper and lower portions thereof are evenly fermented well.

In summary, the controller measures the first time Ts to estimate the outside air temperature and the upper and lower temperature reversing time point X and thus converts the temperature control method so that the heating value of the heating element 132 is lowered to the second heating value $W_2$ before the spare time Tg during which the upper and lower temperature reversing time point X appears. Further, the upper and lower temperature reversing time point X appears after the second time Tx from the time point where the measurement temperature of the temperature sensor reaches 40° C., that is, the first fermentation reference temperature T1, and accordingly, the temperature control method is converted after time (Tx−Tg) from the time point where measurement temperature of the temperature sensor reaches the first fermentation reference temperature T1, thereby allowing the second heating value $W_2$ matched with the corresponding outside air temperature to be supplied.

As mentioned above, the method for cooperatively operating the time point R of converting temperature control with the upper and lower temperature reversing time point X is advantageous in that even if the outside air temperature is low to cause the time point R of converting temperature control to be delayed, the time during which the fermentation material is maintained in the appropriate fermentation temperature range can be almost constantly kept, so that the fermentation is good and the fermentation material is not burned and stuck to the heating part 133.

On the other hand, as appreciated from Table 1, a correlation between the outside air temperature and the second time Tx is not high and their distribution range is not large, so that the second time Tx is set to 145 minutes as an average value of the data, and the temperature control is converted after 85 minutes (=145 min−60 min) from the time point Q of reaching the first fermentation reference temperature, irrespective of the outside air temperature, thereby supplying the second heating value $W_2$ matched with the corresponding outside air temperature. In this case, the data on the second time Tx may be not stored in the DB.

In the temperature control method using the DB, further, the outside air temperature is estimated from the measured value of the first time Ts, and while the value of the second time Tx and the second heating value $W_2$ are being not extracted from the outside air temperature, the measured value of the first time Ts is directly matched with the data on the second time Tx to extract the value of the second time Tx. Otherwise, the measured value of the first time Ts is just matched with the data on the second heating value $W_2$ to extract the second heating value $W_2$. In detail, the DB does not have the data on the first time Ts, the second time Tx, and the second heating value $W_2$ according to the outside air temperatures, but it has the data on the second time Tx and the second heating value $W_2$ according to the data on the first time Ts.

According to the present invention, on the other hand, the yogurt fermenter can directly measure the outside air temperature. For example, the outside air temperature sensor may be mounted on the head part or the coupling part of the yogurt fermenter so as to measure the outside air temperature. In this case, the controller can estimate the upper and lower temperature reversing time point X, even while not measuring the first time Ts, and accordingly, the temperature control method is converted after the time (Tx−Tg) from the time point Q of reaching the first fermentation reference temperature to allow the second heating value $W_2$ matched with the corresponding outside air temperature to be supplied. In this case, the DB may not have the data on the first time Ts.

According to the present invention, furthermore, even if the information stored in the DB of the controller of the yogurt fermenter is collected on the basis of the fermentation container having a given capacity (for example, 1.8 liter), of course, it can be applied in the same manner as above to other fermentation containers having different capacities. For example, it is assumed that the information stored in the DB of the controller of the yogurt fermenter is collected on the basis of the fermentation container having a capacity of 1.8 liter, and if the yogurt fermenter is coupled to a fermentation container having a capacity of 2.3 liter, a heating value supplied per unit volume of the fermentation material stored in the fermentation container having the capacity of 2.3 liter is less than that stored in the fermentation container having the capacity of 1.8 liter, so that the fermentation speed becomes relatively slow. In detail, the first time Tx is relatively long, and also, the upper and lower temperature reversing time point X is relatively slow. Accordingly, the case where the fermentation container having a larger capacity than that having the reference capacity is used is the same as the case where the outside air temperature is much decreased. If the controller measures the value of the first time Ts, irrespective of the capacity of the fermentation container coupled to the yogurt fermenter, it recognizes that the outside air temperature is much decreased through the information stored in the DB, so that the time point R of converting temperature control becomes delayed and the second heating value $W_2$ becomes relatively high, thereby allowing errors caused by the capacity of the fermentation container to rarely appear or disappear.

The temperature control method according to the present invention has been explained on the basis of the proportional control, but at the second temperature control step, even though any method such as, on-off control, stepwise control, proportional control, proportional integral control, proportional differential control, and proportional integral differential control is used, it can be estimated that the upper and lower temperature reversing time point X is determined similar to each other. This is because the upper and lower temperature reversing time point X is determined by the first heating value $W_1$ and the time Tx during which the temperature of the fermentation material is kept to the appropriate fermentation temperature range after the time point Q of reaching the first fermentation reference temperature under a specific outside air temperature condition. Accordingly, even though any method such as, on-off control, stepwise control, proportional control, proportional integral control, proportional differential control, and proportional integral differential control is used so as to allow the temperature of the fermentation material to be kept to the appropriate fermentation temperature range, the temperature control method according to the present invention can be adopted. In this case, commonly, the second fermentation reference temperature T2 is a temperature set to the appropriate fermentation temperature, and the first fermentation reference temperature T1 is a temperature less by 0 to 7° C. than the second fermentation reference temperature T2, so that since it is close to the appropriate fermentation temperature, the control for the step of constantly maintaining the temperature of the fermentation material is started. Also, a maximum heating value is supplied under the first fermentation reference temperature T1, and accordingly, the first fermentation reference temperature T1 is a temperature at which it is expected that the temperature of the fermentation material is not decreased anymore below the temperature in a normal control range.

Figure 11:
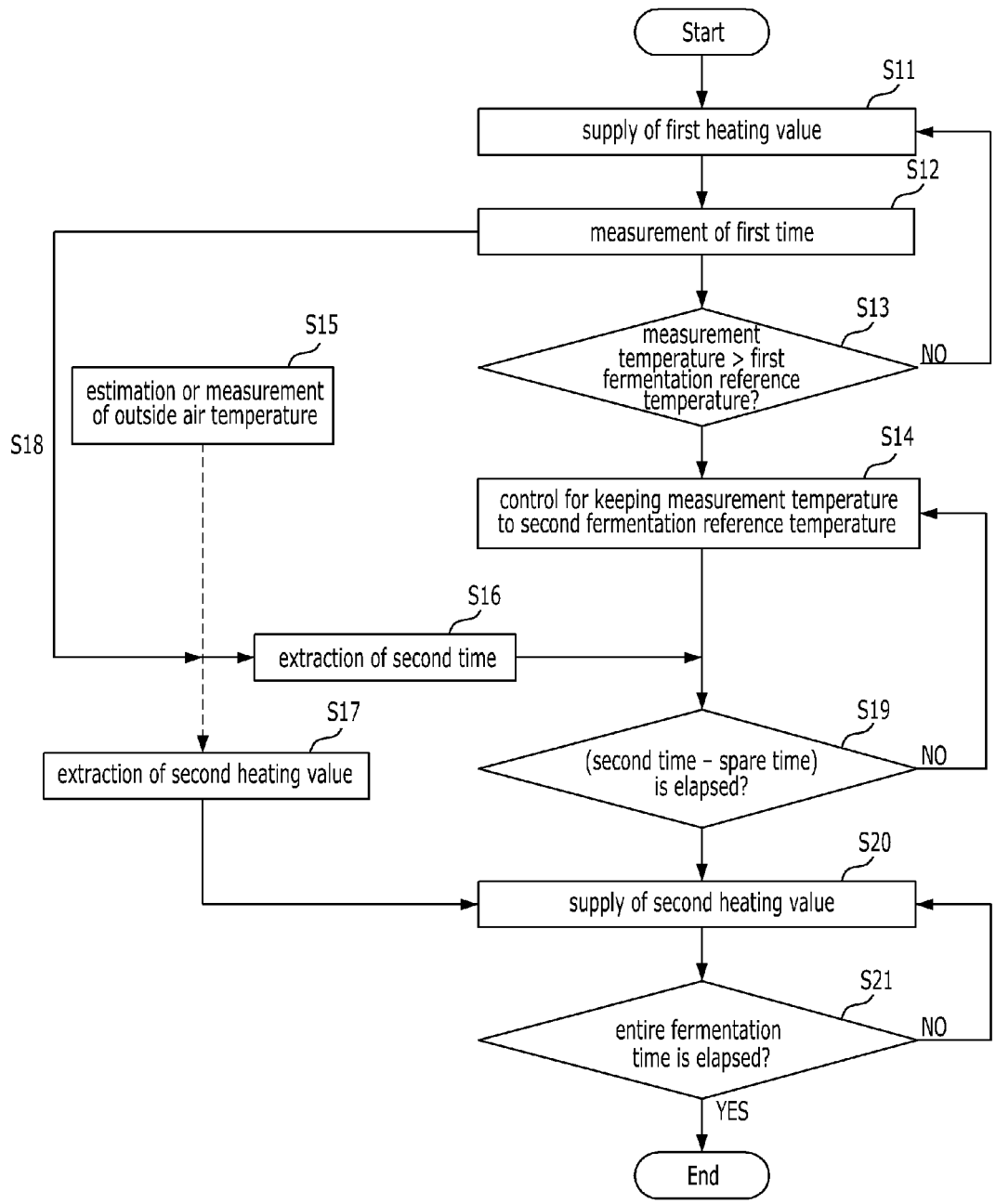
FIG. 11 is a flow chart showing an automatic temperature control method for a yogurt fermenter according to the present invention.

FIG. 11 is a flow chart showing the automatic temperature control method for a yogurt fermenter according to the present invention. Referring to FIG. 11, now, the automatic temperature control method for a yogurt fermenter according to the present invention will be in detail explained. The automatic temperature control method for a yogurt fermenter according to the present invention can be applied to the yogurt fermenters according to the first and second embodiments of the present invention.

According to the present invention, it is assumed that the first fermentation reference temperature T1 is 40° C., the second fermentation reference temperature T2 is 43° C., the first heating value $W_1$ is 30 W, the spare time Tg is 60 minutes, and the information stored in the DB of the controller is Table 1.

The yogurt fermenter is coupled to a fermentation container (e.g., 1.8 liter milk container) and is then operated. The temperature sensor of the yogurt fermenter measures a temperature at the upper portion of the fermentation material in real time. At the initial fermentation step, the heating element 132 continuously supplies the first heating value $W_1$ (30 W), so that a temperature of the fermentation material is continuously increased (at step S11). At this time, if the temperature measured by the temperature sensor reaches the first temperature S1, that is, 27° C. on the basis of Table 1, the time point of reaching the first temperature S1 is checked by the controller. After that, if the temperature measured by the temperature sensor is increased to the second temperature S2, that is, 40° C., the time point of reaching the second temperature S2 is checked by the controller, so that a value of the first time Ts is measured (at step S12). At the time point where the temperature measured by the temperature sensor reaches the first fermentation reference temperature T1, that is, 40° C. (at step S13), the controller controls the heating value of the heating element 132 to allow the temperature of the fermentation material to be kept to the appropriate fermentation temperature range. At this time, the temperature control method is carried out through any one selected from on-off control, stepwise control, proportional control, proportional integral control, proportional differential control, and proportional integral differential control (at step S14). Accordingly, a temperature of the fermentation material is maintained to about 41 to 42° C.

On the other hand, the controller matches the measured first time Ts with the information stored in the DB to estimate an outside air temperature of the fermentation container, and otherwise, the outside air temperature can be directly measured through the outside air temperature sensor mounted on the head part or the coupling part of the yogurt fermenter (as step S15). The controller matches the estimated or measured outside air temperature with the data stored in the DB to estimate the second time Tx elapsed from the time point Q at which the temperature measured by the temperature sensor reaches the first fermentation reference temperature T1, that is, 40° C. up to the time point X at which the temperature at the upper portion of the fermentation material gets lower than that at the lower portion thereof (at step S16), and next, the controller extracts the second heating value $W_2$ matched with the estimated or measured outside air temperature (at step S17). In this case, otherwise, the value of the first time Ts is directly matched with the data stored in the DB (at step S18), thereby extracting a value of the second time Tx and the second heating value $W_2$. The value of the second time Tx may be a predetermined average value of the second time Tx tested at respective outside air temperatures.

The second heating value $W_2$ is supplied before the spare time Tg (60 minutes) faster than the second time Tx extracted after the temperature control is carried out to allow the temperature of the fermentation material to be constantly maintained (at steps S10 and S20). If the entire fermentation time is elapsed, next, the fermentation process is finished (at step S21).

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A yogurt fermenter comprising:
   a head part;
   a coupling part coupled to a lower periphery of the head part in such a manner as to be coupled to an inlet portion of a fermentation container;
   a heating rod coupled to an underside of the head part in such a manner as to be extended downward and thus located inside the fermentation container and having a heating element built in a lower portion thereof in such a manner as to be located at a lower portion of the fermentation container and a temperature sensor built in an upper portion thereof in such a manner as to be located at an upper portion of the fermentation container; and
   a controller for controlling a heating value of the heating element according to a predetermined control logic on the basis of a temperature measured by the temperature sensor,
   wherein i) if the temperature measured by the temperature sensor is lower than a first fermentation reference temperature, the controller allows the heating element to supply a first heating value, ii) from a time point where the temperature measured by the temperature sensor reaches the first fermentation reference temperature, the controller controls the heating value of the heating element to allow a temperature of a fermentation material to be convergedly maintained to a second fermentation reference temperature as a target value on the basis of the temperature measured by the temperature sensor, and iii) the controller allows the heating element to supply a second heating value having a size less than half of the first heating value from a time point coming earlier by predetermined spare time than a time point where temperatures at the upper and lower portions of the fermentation material are reversed to cause the temperature at the upper portion of the fermentation material to be lower than the temperature at the lower portion of the fermentation material, the first fermentation reference temperature being lower than the second fermentation reference temperature, and the spare time being less than time elapsed from the time point where the temperature measured by the temperature sensor reaches the first fermentation reference temperature up to the time point where the temperature at the upper portion of the fermentation material gets lower than the temperature at the lower portion of the fermentation material.

2. A yogurt fermenter comprising:
a body for storing a fermentation material and having a heating element disposed at a lower portion thereof and a temperature sensor built on an upper portion of a side thereof; and
a controller for controlling a heating value of the heating element according to a predetermined control logic on the basis of a temperature measured by the temperature sensor,
wherein i) if the temperature measured by the temperature sensor is lower than a first fermentation reference temperature, the controller allows the heating element to supply a first heating value, ii) from a time point where the temperature measured by the temperature sensor reaches the first fermentation reference temperature, the controller controls the heating value of the heating element to allow a temperature of a fermentation material to be convergedly maintained to a second fermentation reference temperature as a target value on the basis of the temperature measured by the temperature sensor, and iii) the controller allows the heating element to supply a second heating value having a size less than half of the first heating value from a time point coming earlier by predetermined spare time than a time point where temperatures at the upper and lower portions of the fermentation material are reversed to cause the temperature at the upper portion of the fermentation material to be lower than the temperature at the lower portion of the fermentation material, the first fermentation reference temperature being lower than the second fermentation reference temperature, and the spare time being less than time elapsed from the time point where the temperature measured by the temperature sensor reaches the first fermentation reference temperature up to the time point where the temperature at the upper portion of the fermentation material gets lower than the temperature at the lower portion of the fermentation material.

3. The yogurt fermenter according to claim 1, wherein the controller further comprises a DB having first time data on information on first time during which the temperature measured by the temperature sensor is increased from a first temperature up to a second temperature with respect to outside air temperatures indicating temperatures in a space where the fermentation container is located and second time data on information on second time elapsed from the time point where the temperature measured by the temperature sensor reaches the first fermentation reference temperature up to the time point where the temperature at the upper portion of the fermentation material gets lower than the temperature at the lower portion of the fermentation material with respect to the outside air temperatures, and the controller measures the first time during which the temperature measured by the temperature sensor is increased from the first temperature up to the second temperature to match the measured first time with the first time data, to estimate an outside air temperature, to match the estimated outside air temperature with the second time data to extract a value of the second time, and to estimate the time point where the temperature at the upper portion of the fermentation material gets lower than the temperature at the lower portion of the fermentation material, the first temperature being lower than the second temperature, and the second temperature being lower than or equal to the first fermentation reference temperature.

4. The yogurt fermenter according to claim 1, wherein the head part or the coupling part comprises an outside air temperature sensor mounted thereon to measure an outside air temperature, and the controller further comprises a DB having second time data on information on second time elapsed from the time point where the temperature measured by the temperature sensor reaches the first fermentation reference temperature up to the time point where the temperature at the upper portion of the fermentation material gets lower than the temperature at the lower portion of the fermentation material with respect to the outside air temperatures indicating temperatures in a space where the fermentation container is located, so that the controller measures the outside air temperature through the outside air temperature sensor, matches the measured outside air temperature with the second time data, extracts a value of the second time, and estimates the time point where the temperature at the upper portion of the fermentation material gets lower than the temperature at the lower portion of the fermentation material.

5. The yogurt fermenter according to claim 1, wherein the controller estimates, a time point where given time is elapsed from the time point where the temperature measured by the temperature sensor reaches the first fermentation reference temperature, as the time point where the temperature at the upper portion of the fermentation material gets lower than the temperature at the lower portion of the fermentation material, and the given time is average time of the measured time from the time point where the temperature measured by the temperature sensor reaches the first fermentation reference temperature up to the time point where the temperature at the upper portion of the fermentation material gets lower than the temperature at the lower portion of the fermentation material.

6. The yogurt fermenter according to claim 1, wherein the controller further comprises a DB having first time data on information on first time during which the temperature measured by the temperature sensor is increased from a first temperature up to a second temperature with respect to outside air temperatures indicating temperatures in a space where the fermentation container is located and second heating value data on information on a second heating value at which fermentation is good with respect to the outside sir temperatures, without having any fermentation material burned and stuck to the heating part, and the controller measures the first time during which the temperature measured by the temperature sensor is increased from the first temperature up to the second temperature to match the measured first time with the first time data, to estimate the outside air temperature, and to match the estimated outside air temperature with the second heating value data to extract the second heating value, the first temperature being lower than the second temperature.

7. The yogurt fermenter according to claim 1, wherein the head part or the coupling part comprises an outside air temperature sensor mounted thereon to measure an outside air temperature, and the controller further comprises a DB having second heating value data on information on a second heating value at which fermentation is good with respect to the outside sir temperatures, without having any fermentation material burned and stuck to the heating part, with respect to outside air temperatures indicating temperatures in a space where the fermentation container is located, so that the controller measures the outside air temperature through the outside air temperature sensor, matches the measured outside air temperature with the second heating value data, and extracts the second heating value.

8. An automatic temperature control method for a yogurt fermenter having a heating element adapted to supply heat to a lower portion of a fermentation container and a temperature sensor adapted to measure a temperature at an upper portion of the fermentation container in real time, the method comprising the steps of:
   a) if a temperature measured by the temperature sensor is lower than a first fermentation reference temperature, controlling the heating element so that a first heating value is supplied from the heating element;
   b) from a time point where the temperature measured by the temperature sensor reaches the first fermentation reference temperature, controlling the heating value of the heating element to allow a temperature of a fermentation material to be higher than the first fermentation reference temperature and convergedly maintained to a second fermentation reference temperature as a target value on the basis of the temperature measured by the temperature sensor; and
   c) controlling the heating element so that a second heating value having a size less than half of the first heating value is supplied from a time point coming earlier by predetermined spare time than a time point where temperatures at the upper and lower portions of the fermentation material are reversed to cause the temperature at the upper portion of the fermentation material to be lower than the temperature at the lower portion of the fermentation material, the spare time being lower than time elapsed from the time point where the temperature measured by the temperature sensor reaches the first fermentation reference temperature up to the time point where the temperature at the upper portion of the fermentation material gets lower than the temperature at the lower portion of the fermentation material.

9. The method according to claim 8, wherein the yogurt fermenter further comprises a DB having first time data on information on first time during which the temperature measured by the temperature sensor is increased from a predetermined first temperature up to a predetermined second temperature lower than or equal to the first fermentation reference temperature up with respect to outside air temperatures indicating temperatures in a space where the fermentation container is located, and during the step a), time during which the temperature measured by the temperature sensor is increased from the first temperature to the second temperature is measured, so that the measured time is matched with the first time data to estimate the outside air temperature, and otherwise, to estimate the outside air temperature through an outside air temperature sensor mounted on the yogurt fermenter.

10. The method according to claim 9, wherein the DB further has second time data on information on second time elapsed from the time point where the temperature measured by the temperature sensor reaches the first fermentation reference temperature up to the time point where the temperature at the upper portion of the fermentation material gets lower than the temperature at the lower portion of the fermentation material with respect to the outside air temperatures indicating temperatures in a space where the fermentation container is located, and before the step c), the estimated or measured outside air temperature is matched with the second time data to extract a value of the second time so that the time point where the temperature at the upper portion of the fermentation material gets lower than the temperature at the lower portion of the fermentation material is estimated.

11. The method according to claim 9, wherein the DB has second heating value data on information on a second heating value matched with the outside sir temperatures, and the estimated or measured outside air temperature is matched with the second heating value data to extract the second heating value.

12. The method according to claim 8, further comprising, before the step c), the step of estimating a time point where given time is elapsed from the time point where the temperature measured by the temperature sensor reaches the first fermentation reference temperature, as the time point where the temperature at the upper portion of the fermentation material gets lower than the temperature at the lower portion of the fermentation material, and the given time is predetermined average time of the measured time from the time point where the temperature measured by the temperature sensor reaches the first fermentation reference temperature up to the time point where the temperature at the upper portion of the fermentation material gets lower than the temperature at the lower portion of the fermentation material.

* * * * *